United States Patent
Watanabe et al.

(10) Patent No.: US 7,594,762 B2
(45) Date of Patent: *Sep. 29, 2009

(54) THRUST NEEDLE ROLLER BEARING, SUPPORT STRUCTURE RECEIVING THRUST LOAD OF COMPRESSOR FOR CAR AIR-CONDITIONER, SUPPORT STRUCTURE RECEIVING THRUST LOAD OF AUTOMATIC TRANSMISSION, SUPPORT STRUCTURE FOR CONTINUOUSLY VARIABLE TRANSMISSION, AND SUPPORT STRUCTURE RECEIVIN

(75) Inventors: Yasuyuki Watanabe, Iwata (JP); Kousuke Obayashi, Iwata (JP)

(73) Assignee: NTN Corporation, Osaka (JP)

( * ) Notice: Subject to any disclaimer, the term of this patent is extended or adjusted under 35 U.S.C. 154(b) by 400 days.

This patent is subject to a terminal disclaimer.

(21) Appl. No.: 10/585,646

(22) PCT Filed: Dec. 20, 2004

(86) PCT No.: PCT/JP2004/019017

§ 371 (c)(1),
(2), (4) Date: Jul. 7, 2006

(87) PCT Pub. No.: WO2005/066513

PCT Pub. Date: Jul. 21, 2005

(65) Prior Publication Data

US 2008/0118196 A1    May 22, 2008

(30) Foreign Application Priority Data

Jan. 9, 2004  (JP) ............................. 2004-004355
Feb. 17, 2004 (JP) ............................. 2004-040031
Feb. 17, 2004 (JP) ............................. 2004-040085

(51) Int. Cl.
*F16C 33/62* (2006.01)
(52) U.S. Cl. ..................... 384/618; 384/625
(58) Field of Classification Search ......... 384/618–623, 384/625
See application file for complete search history.

(56) References Cited

U.S. PATENT DOCUMENTS 3,954,517 A    5/1976    Jatczak et al.

(Continued)

FOREIGN PATENT DOCUMENTS

CN    1344932 A    4/2002

(Continued)

OTHER PUBLICATIONS

Japanese Office Action, with English Translation, issued in Japanese Patent Application No. 2002-194775, dated on Mar. 22, 2006.

(Continued)

*Primary Examiner*—Thomas R Hannon
(74) *Attorney, Agent, or Firm*—McDermott Will & Emery LLP

(57) ABSTRACT

A thrust needle roller bearing has a washer formed of a thin steel plate and needle rollers, at least said washer has a nitrogen enriched layer at a surface layer portion, amount of retained austenite in said surface layer portion is at least 5 volume % and at most 25 volume %, and austenite grain number of said surface layer portion is 11 or higher. Thus, a long life thrust needle roller bearing resistant to an early failure caused by surface damage such as surface-originated flaking and also resistant to common, load dependent rolling contact fatigue can be provided.

10 Claims, 14 Drawing Sheets

U.S. PATENT DOCUMENTS

| | | | |
|---|---|---|---|
| 4,162,419 | A | 7/1979 | DeAngelis |
| 4,930,909 | A | 6/1990 | Murakami et al. |
| 4,971,634 | A | 11/1990 | Shibata et al. |
| 5,085,733 | A | 2/1992 | Mitamura |
| 5,129,966 | A | 7/1992 | Rao |
| 5,137,375 | A | 8/1992 | Murakami et al. |
| 5,180,450 | A | 1/1993 | Rao |
| 5,338,377 | A | 8/1994 | Mitamura et al. |
| 5,352,303 | A | 10/1994 | Murakami et al. |
| 5,375,323 | A | 12/1994 | Sata |
| 5,413,643 | A | 5/1995 | Murakami et al. |
| 5,427,457 | A | 6/1995 | Furumura et al. |
| 5,427,600 | A | 6/1995 | Itoh et al. |
| 5,456,136 | A | 10/1995 | Yamashita et al. |
| 5,456,766 | A | 10/1995 | Beswick et al. |
| 5,595,610 | A | 1/1997 | Maeda et al. |
| 5,611,250 | A | 3/1997 | Narai et al. |
| 5,658,082 | A | 8/1997 | Tsushima et al. |
| 5,733,667 | A | 3/1998 | Nakasuji et al. |
| 5,772,956 | A | 6/1998 | Hasegawa et al. |
| 5,775,280 | A | 7/1998 | Schmidt et al. |
| 5,792,286 | A | 8/1998 | Inoue et al. |
| 5,803,993 | A | 9/1998 | Yoshida et al. |
| 5,848,846 | A | 12/1998 | Sugiyama et al. |
| 5,853,249 | A | 12/1998 | Maeda et al. |
| 5,944,916 | A | 8/1999 | Chung |
| 5,972,130 | A | 10/1999 | Underys et al. |
| 5,979,383 | A | 11/1999 | Faville et al. |
| 6,012,851 | A | 1/2000 | Hirakawa et al. |
| 6,086,686 | A | 7/2000 | Tanaka et al. |
| 6,095,692 | A | 8/2000 | Takemura |
| 6,149,734 | A | 11/2000 | Isogai et al. |
| 6,158,263 | A | 12/2000 | Maeda et al. |
| 6,165,289 | A | 12/2000 | Matsumoto et al. |
| 6,224,688 | B1 | 5/2001 | Takemura et al. |
| 6,251,198 | B1 | 6/2001 | Koo et al. |
| 6,258,179 | B1 | 7/2001 | Takayama et al. |
| 6,290,398 | B1 | 9/2001 | Fujiwara et al. |
| 6,306,227 | B2 | 10/2001 | Okayama et al. |
| 6,309,475 | B1 | 10/2001 | Takayama et al. |
| 6,328,009 | B1 | 12/2001 | Brothers |
| 6,342,109 | B1 | 1/2002 | Takemura et al. |
| 6,423,158 | B1 | 7/2002 | Maeda et al. |
| 6,440,232 | B1 | 8/2002 | Takemura et al. |
| 6,447,619 | B1 | 9/2002 | Takayama et al. |
| 6,488,789 | B2 | 12/2002 | Tajima et al. |
| 6,532,920 | B1 | 3/2003 | Sweetnam et al. |
| 6,582,532 | B1 | 6/2003 | Kurebayashi et al. |
| 6,602,358 | B1 | 8/2003 | Ochi et al. |
| 6,641,680 | B2 | 11/2003 | Nishimori et al. |
| 6,699,335 | B2 | 3/2004 | Murakami et al. |
| 6,855,217 | B2 | 2/2005 | Suzuki |
| 7,147,382 | B2 | 12/2006 | Suzuki et al. |
| 2002/0043111 | A1 | 4/2002 | Takagi et al. |
| 2002/0082133 | A1 | 6/2002 | Yoshikawa et al. |
| 2002/0088511 | A1 | 7/2002 | Nakamura et al. |
| 2002/0159905 | A1 | 10/2002 | Bachmann et al. |
| 2003/0037635 | A1 | 2/2003 | Tsuchiyama et al. |
| 2003/0040401 | A1 | 2/2003 | Okita et al. |
| 2003/0063829 | A1* | 4/2003 | Tamada et al. ............ 384/621 |
| 2003/0075244 | A1 | 4/2003 | Kurebayashi et al. |
| 2003/0123769 | A1 | 7/2003 | Ohki |
| 2004/0079310 | A1 | 4/2004 | Suzuki et al. |
| 2004/0170348 | A1 | 9/2004 | Okugami et al. |
| 2004/0170761 | A1 | 9/2004 | Li et al. |
| 2004/0179761 | A1 | 9/2004 | Ohki et al. |
| 2004/0228561 | A1 | 11/2004 | Okugami et al. |
| 2005/0045247 | A1 | 3/2005 | Ohki |
| 2005/0109308 | A1 | 5/2005 | Suzuki et al. |
| 2005/0205163 | A1 | 9/2005 | Ohki |
| 2007/0034301 | A1 | 2/2007 | Hasegawa et al. |
| 2007/0151633 | A1* | 7/2007 | Ohki et al. ............ 148/318 |
| 2007/0169850 | A1 | 7/2007 | Ohki et al. |

FOREIGN PATENT DOCUMENTS

| | | |
|---|---|---|
| CN | 1351694 | 5/2002 |
| CN | 1421541 | 6/2003 |
| DE | 4 204 982 A1 | 8/1993 |
| DE | 199 60 803 A1 | 6/2000 |
| DE | 102 54 635 A1 | 6/2003 |
| EP | 0 458 646 | 11/1991 |
| EP | 0 600 421 | 6/1994 |
| EP | 06 626 468 A1 | 11/1994 |
| EP | 0 723 034 A2 | 7/1996 |
| EP | 0 811 789 A1 | 12/1997 |
| EP | 0 950 723 A1 | 10/1999 |
| EP | 1 070 760 A2 | 1/2001 |
| EP | 1 158 064 A1 | 11/2001 |
| EP | 1 273 672 A1 | 1/2003 |
| EP | 1 411 142 A1 | 4/2004 |
| FR | 2 841 907 | 1/2004 |
| GB | 2 258 274 A | 2/1993 |
| JP | 48-028308 | 4/1973 |
| JP | 63-185917 | 11/1988 |
| JP | 02-125841 A | 5/1990 |
| JP | 02-190615 | 7/1990 |
| JP | 03-116706 | 12/1991 |
| JP | 04-254574 | 9/1992 |
| JP | 05-009584 | 1/1993 |
| JP | 05-163563 A | 6/1993 |
| JP | 05-179350 | 7/1993 |
| JP | 05-263091 | 10/1993 |
| JP | 6-101424 | 4/1994 |
| JP | 06-117438 | 4/1994 |
| JP | 06-247253 | 9/1994 |
| JP | 06-286577 | 10/1994 |
| JP | 06-341441 | 12/1994 |
| JP | 07-027139 | 1/1995 |
| JP | 08-004774 | 1/1996 |
| JP | 08-049057 | 2/1996 |
| JP | 08-233070 | 9/1996 |
| JP | 9-53148 A | 2/1997 |
| JP | 09-176740 | 7/1997 |
| JP | 09-316601 | 12/1997 |
| JP | 09-329139 | 12/1997 |
| JP | 10-030150 | 2/1998 |
| JP | 10-047334 | 2/1998 |
| JP | 10-068419 | 3/1998 |
| JP | 10-103339 | 4/1998 |
| JP | 10-110720 | 4/1998 |
| JP | 10-168515 | 6/1998 |
| JP | 10-184701 | 7/1998 |
| JP | 10-204612 | 8/1998 |
| JP | 11-080897 | 3/1999 |
| JP | 11-101247 | 4/1999 |
| JP | 11-140543 | 5/1999 |
| JP | 11-303874 A | 11/1999 |
| JP | 2000-038906 | 2/2000 |
| JP | 2000-038907 | 2/2000 |
| JP | 2000-54810 | 2/2000 |
| JP | 2000-129347 | 5/2000 |
| JP | 2000-205284 | 7/2000 |
| JP | 2000-212721 | 8/2000 |
| JP | 2001-123244 | 5/2001 |
| JP | 2001-200314 | 7/2001 |
| JP | 2002-031212 | 1/2002 |
| JP | 2002-70872 A | 3/2002 |
| JP | 2002-120508 | 4/2002 |
| JP | 2002-180203 | 6/2002 |
| JP | 2002-194438 | 7/2002 |
| JP | 2002-256336 | 9/2002 |
| JP | 2002-339054 | 11/2002 |
| JP | 2003-56315 | 2/2003 |

| | | | |
|---|---|---|---|
| JP | 2003-83337 A | 3/2003 | |
| JP | 2003-83339 A | 3/2003 | |
| JP | 2003-156050 A | 5/2003 | |
| JP | 2003-226918 | 8/2003 | |
| JP | 2003-226919 A | 8/2003 | |
| JP | 2003-287035 A | 10/2003 | |
| JP | 2003-294034 A | 10/2003 | |
| WO | WO 91/00929 | 1/1991 | |
| WO | WO 02/40730 A1 | 5/2002 | |

OTHER PUBLICATIONS

Japanese Office Action, with English Translation, issued in Japanese Patent Application No. 2002-194793, dated on Mar. 22, 2006.
Japanese Office Action, with English Translation, issued in Japanese Patent Application No. 2002-194804, dated on Mar. 20, 2007.
Japanese Office Action, with English Translation, issued in Japanese Patent Application No. 2002-194804, dated on Nov. 28, 2006.
Japanese Office Action, with English Translation, issued in Japanese Patent Application No. 2002-194921, dated on Nov. 28, 2006.
Japanese Office Action, with English Translation, issued in Japanese Patent Application No. 2002-303036, dated on Apr. 25, 2006.
Japanese Office Action, with English Translation, issued in Japanese Patent Application No. 2002-303036, dated on Oct. 24, 2006.
Japanese Office Action, with English Translation, issued in Japanese Patent Application No. 2003-209737, dated on Feb. 6, 2007.
European Search Report, issued in European Patent Application No. 05703409.2-2424, dated on Apr. 4, 2007.
Chinese Office Action, with English Translation, issued in Chinese Patent Application No. 200410008248.9, dated on Apr. 27, 2007.
Annual book of ASTM Standards Section Three Metals Test Methods and Analytical Procedures, 2003, vol. 03.01, ASTM, International Standards Worldwide.
JIS G 0551 "Methods of austenite grain size determination for steel", Published by Japanese Standards Association, Feb. 20, 1998.
JIS Z 2242 "Method of impact test for metallic materials", Published by Japanese Standards Association, Dec. 21, 1998.
JIS Z 2202 "Test pieces for impact test for metallic materials" Published by Japanese Standards Association, Feb. 20, 1998.
Burrier, Jr., H., "Hardenability of Carbon and Low-Allow Steels", 2002, ASM International.
Vander Voort, G., "Embrittlement of Steels", 2002 ASM International.
Kim, C., et al., "Influence of Subzero and Shot-Peening Treatments on Impact and Fatigue Fracture Properties of Case-Hardened Steels", J. Heat Treat., Jun. 1981, pp. 43-53, vol. 2 No 1.
US Office Action, issued in U.S. Appl. No. 10/686,766, dated on Nov. 7, 2007.
US Office Action, issued in U.S. App. No. 10/787,221, dated on Oct. 26, 2007.
"Technical Means for Improvement of Service Life of a Rolling Bearing," No. 5, 2001, pp. 1, 2, 5, 45; w/ English translation of relevant portion.
"Metallic Material Refining Technology," May 1995, p. 47; w/ English translation of relevant portion.
Chinese office Action, w/ English translation thereof, issued in Chinese Patent Application No. 200610004620.8 dated on Sep. 5, 2008.
European Search Report, issued in European Patent Application No. EP 04807274.6-1252 dated on Dec. 18, 2008.
Japanese Office Action, with English translation, issued in Japanese Patent Application No. JP 2004-053995 dated on Jun. 17, 2008.

* cited by examiner 0.05mm 0.05mm

THRUST NEEDLE ROLLER BEARING, SUPPORT STRUCTURE RECEIVING THRUST LOAD OF COMPRESSOR FOR CAR AIR-CONDITIONER, SUPPORT STRUCTURE RECEIVING THRUST LOAD OF AUTOMATIC TRANSMISSION, SUPPORT STRUCTURE FOR CONTINUOUSLY VARIABLE TRANSMISSION, AND SUPPORT STRUCTURE RECEIVIN

RELATED APPLICATION

This application is the U.S. National Phase under 35 U.S.C. § 371 of international Application No. PCT/JP2004/019017, filed on Dec. 20, 2004, which in turn claims the benefit of Japanese Application No. 2004-004355, filed on Jan. 9, 2004, Japanese Application No. 2004-040031, filed on Feb. 17, 2004, Japanese Application No. 2004-040085, filed on Feb. 17, 2004 the disclosures of which Applications are incorporated by reference herein.

1. Technical Field

The present invention relates to a thrust needle roller bearing, a support structure receiving thrust load of a compressor for car air-conditioner, a support structure receiving thrust load of an automatic transmission, a support structure for a continuously variable transmission and a support structure receiving thrust load of a manual transmission.

2. Background Art

A thrust needle roller bearing consists of needle rollers, a cage and a washer, in which the needle rollers are in line-contact with the washer. Therefore, the bearing advantageously attains high load carrying capacity and high rigidity, for its small projection area. Therefore, a thrust needle roller bearing is used in a support structure of a compressor for car air-conditioner and a support structure of a transmission (manual transmission, automatic transmission and continuously variable transmission).

Such a thrust needle roller bearing is disclosed, for example, in Patent Document 1 (Japanese Patent Laying-Open No. 2002-70872).

Oil used in a compressor for a car air-conditioner has low viscosity, and the amount of oil is made small in order to improve compressor performance (cooling performance). As the bearing is used under such severe, low viscosity lubrication conditions, the bearing might possibly fail at an early stage because of surface damage, such as surface-originated flaking, if there is much differential slip at the roller.

Conventionally, auto manufacturers and manufacturers of automatic transmissions sometimes use oil with an additive, in view of energy saving. The oil with such an additive has lower lubrication performance on the bearing, and therefore, improvement of existing thrust bearings involving much differential slip at the rollers has been desired, from the viewpoint of surface damage such as surface-originated flaking.

There is a tendency that compressors for car air-conditioner and transmissions are used under higher load, and therefore, improvement of existing bearings is also desirable from the viewpoint of subsurface-originated flaking caused by common load-dependent rolling contact fatigue.

Therefore, a bearing of long life that is resistant to an early failure caused by surface damage such as surface-originated flaking and resistant also to subsurface-originated flaking caused by common load-dependent rolling contact fatigue is desired.

Patent Document 1: Japanese Patent Laying-Open No. 2002-70872

DISCLOSURE OF THE INVENTION

Problems to be Solved by the Invention

Conventionally, as a material for the washer of a thrust needle roller bearing, readily processable and available steel plate and steel tape material that allows press-processing, including low carbon structural steel, cold-rolled steel plate, medium carbon steel or bearing steel has been used. When low carbon structural steel, cold-rolled steel plate or steel tape is used, carburization or carbonitriding process is performed as heat treatment of the washer, and when medium carbon steel or bearing steel is used, bright quenching or induction hardening is performed.

Bearing steel is used as the material of the roller of a conventional thrust needle roller bearing, and bright quenching or induction hardening is performed as heat treatment.

In a thrust needle roller bearing, heat caused by differential slip at the roller may induce damage such as surface-originated flaking. Enforcement of the washer against the surface damage including the surface-originated flaking is desired.

Further, under heavy load conditions, subsurface-originated flaking also occurs because of common load-dependent rolling contact fatigue, and longer life is desired.

The present invention was made in view of the foregoing and an object is to provide a long life thrust needle roller bearing having at least washer characteristic changed to be resistant to an early failure caused by surface damage such as surface-originated flaking and resistant also to common load-dependent rolling contact fatigue.

The present invention was made in view of the foregoing and another object is to provide a long life support structure receiving thrust load of a compressor for car air-conditioner, having at least washer characteristic changed to be resistant to an early failure caused by surface damage such as surface-originated flaking and resistant also to common load-dependent rolling contact fatigue.

The present invention was made in view of the foregoing and a further object is to provide a long life support structure receiving thrust load of an automatic transmission, of which thrust needle roller bearing is resistant to an early failure caused by surface damage such as surface-originated flaking and resistant also to common load-dependent rolling contact fatigue.

The present invention was made in view of the foregoing and a still further object is to provide a long life support structure for a continuously variable transmission, of which thrust needle roller bearing is resistant to an early failure caused by surface damage such as surface-originated flaking and resistant also to common load-dependent rolling contact fatigue.

The present invention was made in view of the foregoing and a still further object is to provide a long life support structure receiving thrust load of a manual transmission, of which thrust needle roller bearing is resistant to an early failure caused by surface damage such as surface-originated flaking and resistant also to common load-dependent rolling contact fatigue.

Means for Solving the Problems

The present invention provides a thrust needle roller bearing having a washer formed of a thin steel plate and needle rollers, wherein at least the washer has a nitrogen enriched layer at a surface layer portion, amount of retained austenite in the surface layer portion is at least 5 volume % and at most 25 volume %, and austenite grain size number of the surface layer portion is 11 or higher.

In the thrust needle roller bearing described above, preferably, nitrogen content of the surface layer portion is in the range of 0.1 mass % to 0.7 mass %.

The support structure receiving thrust load of a compressor for a car air-conditioner in accordance with the present invention is a support structure receiving thrust load of a compressor for a car air-conditioner in which a swash plate rotates as a main shaft rotates and a piston swings accordingly, including a thrust needle roller bearing receiving thrust load generated by the rotation of the swash plate, having a washer formed of a thin steel plate and needle rollers, wherein at least the washer has a nitrogen enriched layer at a surface layer portion, amount of retained austenite in the surface layer portion is at least 5 volume % and at most 25 volume %, and austenite grain size number of the surface layer portion is 11 or higher.

In the support structure receiving thrust load of a compressor for a car air-conditioner, preferably, nitrogen content of the surface layer portion is in the range of 0.1 mass % to 0.7 mass %.

The support structure receiving thrust load of an automatic transmission in accordance with the present invention is a support structure receiving thrust load of an automatic transmission including a torque converter having an impeller and a turbine opposite to each other with a stator in between, including a thrust needle roller bearing having a washer formed of a thin steel plate and needle rollers, at least between the stator and the impeller or between the stator and the turbine. At least the washer has a nitrogen enriched layer at a surface layer portion, amount of retained austenite in the surface layer portion is at least 5 volume % and at most 25 volume %, and austenite grain size number of the surface layer portion is 11 or higher.

In the support structure receiving thrust load of an automatic transmission, preferably, nitrogen content of the surface layer portion is in the range of 0.1 mass % to 0.7 mass %.

The support structure for a continuously variable transmission in accordance with the present invention is a support structure for a continuously variable transmission in which rotation of an input shaft is changed in a nonstep manner and transmitted to an output shaft. A thrust needle roller bearing receiving thrust load generated by the rotation either of the input shaft or the output shaft has a washer formed of a thin steel plate and needle rollers, at least the washer has a nitrogen enriched layer at a surface layer portion, amount of retained austenite in the surface layer portion is at least 5 volume % and at most 25 volume %, and austenite grain size number of the surface layer portion is 11 or higher.

In the support structure for a continuously variable transmission, preferably, nitrogen content of the surface layer portion of the thrust needle roller bearing is in the range of 0.1 mass % to 0.7 mass %.

The support structure receiving thrust load of a manual transmission in accordance with the present invention is a support structure receiving thrust load of a manual transmission allowing, by engagement between a gear of an input shaft and a gear of a counter shaft and engagement between a gear of the counter shaft and a gear of an output shaft, stepwise change of speed of rotation of the output shaft from the speed of rotation of the input shaft, including a thrust needle roller bearing receiving thrust load of any of the input shaft, the counter shaft and the output shaft, having a washer formed of a thin steel plate and needle rollers, wherein at least the washer has a nitrogen enriched layer at a surface layer portion, amount of retained austenite in the surface layer portion is at least 5 volume % and at most 25 volume %, and austenite grain size number of the surface layer portion is 11 or higher.

In the support structure receiving thrust load of a manual transmission, preferably, nitrogen content of the surface layer portion of the thrust needle roller bearing is in the range of 0.1 mass % to 0.7 mass %.

Effects of the Invention

In the thrust needle roller bearing in accordance with the present invention, the washer material is adapted to have fine crystal grain size and high heat resistance, and therefore, life defined by surface-originated flaking (surface damage such as peeling and smearing) and life defined by subsurface-originated flaking can both be improved.

In the support structure receiving thrust load of a compressor for a car air-conditioner in accordance with the present invention, the washer material is adapted to have fine crystal grain size and high heat resistance, and therefore, life defined by surface-originated flaking (surface damage such as peeling and smearing) and life defined by subsurface-originated flaking can both be improved.

In the support structure receiving thrust load of an automatic transmission in accordance with the present invention, the washer material of the thrust needle roller bearing is adapted to have fine crystal grain size and high heat resistance, and therefore, life defined by surface-originated flaking (surface damage such as peeling and smearing) and life defined by subsurface-originated flaking can both be improved.

In the support structure for a continuously variable transmission in accordance with the present invention, the washer material of the thrust needle roller bearing is adapted to have fine crystal grain size and high heat resistance, and therefore, life defined by surface-originated flaking (surface damage such as peeling and smearing) and life defined by subsurface-originated flaking can both be improved.

In the support structure receiving thrust load of a manual transmission in accordance with the present invention, the washer material of the thrust needle roller bearing is adapted to have fine crystal grain size and high heat resistance, and therefore, life defined by surface-originated flaking (surface damage such as peeling and smearing) and life defined by subsurface-originated flaking can both be improved.

Specifically, by devising and adjusting processing and heat treatment of the material such as bearing steel and medium carbon steel, a carbonitrided texture (nitrogen enriched layer) reliably having austenite grain size number of 11 or higher can be obtained. This texture significantly increases resistance to generation and development of cracks. As a result, heat generation at a surface layer caused by slipping or surface cracks caused by tangential force can be suppressed. Further, the inventors have found that significantly longer life can be attained as regards cracks caused by subsurface-originated flaking.

Considering the surface damage such as the surface-originated flaking, it is particularly essential that a heat-resistant, nitrogen enriched layer having fine carbide deposited at the surface layer portion is formed. In the present invention, a nitrogen enriched layer is formed, and in addition, at least 5 volume % of retained austenite exists at the surface layer portion and the austenite at the surface layer portion is as fine as to have austenite grain size number of 11 or higher. Thus, surface damage such as surface-originated flaking can be suppressed.

The retained austenite existing in the nitrogen enriched layer at the surface layer portion is a factor that decreases surface hardness. Therefore, it is necessary to decrease the amount of retained austenite than a carbonitrided article, through quenching after carbonitriding process, by re-heating to a temperature lower than the temperature of carbonitriding process. In the present invention, the retained austenite at the surface layer portion is reduced to 25 volume % or lower, and therefore, decrease in surface hardness can be suppressed.

With the above-described micro-texture as a basic component, further processing or heat treatment is performed to exert compressive stress on the surface layer described above, to further increase hardness, whereby longer life can be attained. As the processing or heat treatment, a technique such as (b1) shot peening, (b2) barreling, (b3) rolling, (b4) carburization+carbonitriding, (b5) carbonitriding+sub zero treatment or (b6) carbonitriding+secondary quenching+sub zero treatment may be applied by itself, or combination of techniques (b1) to (b6) may be applied.

At least one of the washer and the roller may be subjected to the carbonitriding process at $A_1$ transformation point or higher, cooled to a temperature lower than the $A_1$ transformation point, thereafter heated to a quenching temperature lower than the temperature of carbonitriding process, and then quenched from that quenching temperature.

In the process of cooling to a temperature lower than the $A_1$ transformation point after carbonitriding at the carbonitriding temperature, the temperature may be lowered to room temperature by oil quenching, or cooled to a temperature at which austenite transformation is completed at least to a prescribed value. By the manufacturing method described above, a metal texture having a nitrogen enriched layer, fine austenite grains and containing appropriate amount of retained austenite can be obtained. Consequently, life defined by surface-originated flaking and life defined by subsurface-originated flaking can both be improved. Further, a thrust needle roller bearing, a support structure receiving thrust load of a compressor of a car air-conditioner, a support structure receiving thrust load of an automatic transmission, a support structure for a continuously variable transmission and a support structure receiving thrust load of a manual transmission can be provided, in which dimensional variation with aging is suppressed.

As described above, the nitrogen enriched layer is formed by carbonitriding process, and the nitrogen enriched layer may or may not be carbon-enriched.

In such a micro-texture, very fine austenite crystal grains can be obtained, as it is once cooled after carbonitriding process and quenched from a quenching temperature lower than the temperature of carbonitriding process. The process of heating to the quenching temperature lower than the temperature of carbonitriding process and quenching is sometimes referred to as secondary quenching or final quenching, in view of the order of processing.

The quenching temperature mentioned above may be in a temperature range where carbide and/or nitride and austenite phase co-exist at least in the surface layer portion of the carbonitrided steel.

As the heating temperature at the time of quenching is lower than the heating temperature of carbonitriding process, the amount of carbide and/or nitride not-yet-absorbed at the surface layer portion subject to the effect of carbonitriding process is increased than in the carbonitriding process. Therefore, when the quenching temperature is in the above-described co-existing temperature range, the ratio of not-yet-absorbed carbide/nitride at the quenching temperature is increased than in the carbonitriding process, and the ratio of austenite amount decreases. Further, it can be seen from the binary phase diagram of iron-carbon, in the region where carbide (cementite) and austenite co-exist, that concentration of carbon contained as solid solution in austenite decreases as the quenching temperature decreases. The steel used for a bearing has low content of other alloy element such as Si (silicon) or Mn (manganese) and, therefore, it is possible with sufficiently high accuracy to discuss temperature ranges and generated layers, using the iron-carbon binary phase diagram. Further, similar to carbon, nitrogen is contained as interstitial solid solution in iron, and generates nitride with iron similar to cementite in a prescribed temperature range. Therefore, it can be regarded as the same as carbon, in approximation.

When heated to the quenching temperature, there is a large amount of carbide and/or nitride that is not yet absorbed and prevents growth of austenite grains, and hence, the austenite grains come to be very fine. Further, the texture transformed by quenching from austenite to martensite has slightly lower carbon concentration when subjected to the heat treatment described above, and therefore, the texture comes to have slightly higher toughness than the texture quenched from the carbonitriding temperature. Specifically, the quenched texture comes to have (c1) not-yet-absorbed carbide and/or nitride of larger amount than the conventional example and (c2) carbon concentration lower than the conventional example.

The quenching temperature mentioned above may be set to 780° C. to 830° C. This temperature range may be applied to almost every steel material, so that management of quenching temperature is simplified.

Further, at least one of the washer and roller described above may be subjected to cold working such as pressing, prior to the carbonitriding process.

By performing such cold working, nucleation density of austenite grains at the time of heat treatment increases, and very fine texture can be obtained.

Further, to at least one of the washer and the roller described above, compressive stress of at least 500 MPa may be applied.

As already described, with the above-described micro-texture as a basic component, further processing or heat treatment may be performed to exert compressive stress on the surface layer described above, whereby longer life can be attained.

In the present specification, austenite grain size number refers to the grain size number of austenite defined by the method of austenite grain size determination in accordance with JIS G 0551.

In the present specification, the austenite grain refers to austenite crystal grain that is phase-transformed during quenching, and refers to the one remaining even after transformation by cooling to martensite, as the past history.

The austenite crystal grains should have grain boundary that can be observed by performing a process such as etching to expose the grain boundary on a metallographic sample of the object member. The grains are also referred to as old austenite grains, meaning the grain boundary at a heated time point immediately before low-temperature quenching. As to the measurement, an average value of grain numbers of JIS standard may be converted as an equivalent to the average grain diameter, or a section method or the like may be used, in which an average of distances at which straight lines in random direction overlapped on the metallographic sample meet the grain boundary is calculated and multiplied by a correction coefficient to obtain the two-dimensional to three-dimensional distance.

The retained austenite is measured using various X-ray diffraction methods, in which, by way of example, diffraction intensity of appropriate Miller indices of the austenite phase is found, and compared with diffraction intensity of appropriate Miller indices of the ferrite phase. At this time, height of diffraction peak may be used, or area of diffraction peak may be used. Alternatively, it can be measured utilizing the fact that the austenite phase is non-magnetic and the ferrite phase is ferromagnetic, by finding magnetizing force using a magnetic balance. It can also be measured easily by a commercially available measuring device.

At the time of low temperature quenching, the austenite phase transforms to martensite and the like. The retained austenite refers to austenite left untransformed after the temperature is cooled to the room temperature, between adjacent martensite bundles or the like that transform along different crystal faces. Therefore, it is not directly related to the austenite crystal grains of which range of average grain size is limited as described above.

It is not effective when the nitrogen content at the surface layer portion is smaller than 0.1 mass %, and rolling contact fatigue life decreases particularly in the presence of foreign matters. When the nitrogen content is larger than 0.7 mass %, pores referred to as voids are generated, or the amount of retained austenite becomes too large to attain sufficient hardness, so that the life becomes shorter. The nitrogen content of the nitrogen enriched layer formed in the washer is represented by a value at the surface layer of 50 μm from the surface of washer after grinding, which may be measured by an EPMA (Electron Probe Micro-Analysis).

DESCRIPTION OF THE REFERENCE SIGNS 1, 505a, 505b, 506a, 506b, 570, 571 washer, 1a through hole, 2, 2a, 2b needle roller, 3 cage, 3a, 3b annular member, 10, 10A, 10B, 510 thrust needle roller bearing, 100 double-sided swash plate compressor, 102, 202, 302, 606 housing, 103 swash plate, 104 main shaft, 105 radial bearing, 106 cylinder bore, 107 piston, 108 recessed portion, 109 shoe, 200 one-sided swash plate compressor, 203 swash plate, 204, 304 main shaft, 207 piston, 211 coupling member, 215 piston rod, 300 variable capacity swash plate compressor, 303 journal, 307 piston, 312 piston support, 313 drive pin, 314 sleeve, 315 piston rod, 500 torque converter, 501 impeller, 501a impeller blade, 501b impeller hub, 502 stator, 503 turbine, 503a turbine blade, 503b turbine hub, 504 one-directional clutch, 551, 561, 601a shaft, 552 case, 553, 558, 563 bearing, 554 sync-hub, 555, 557 idle gear, 555a clutch gear, 559 diameter expanded shaft portion, 559a right side step surface, 559b left side step surface, 565, 567 gear, 568 scissors gear, 600 non-step variable speed gear mechanism, 601 primary shaft, 601b sun gear, 602 primary pulley, 602a fixed pulley, 602b movable pulley, 603 secondary shaft, 604 secondary pulley, 604a fixed pulley, 604b movable pulley, 605 belt, 610 forward/backward switching mechanism, 611 roller bearing, 612 support member, 612a planetary pinion, 613 support member, 613a ring gear, 615, 616 multiple-disk clutch, 650 manual transmission, 661 input shaft, 662 output shaft, 663 counter shaft, 664a~664k gear, 665 housing, 660A~660D roller bearing.

BEST MODES FOR CARRYING OUT THE INVENTION

Embodiments of the present invention will be described with reference to the figures.

Embodiment 1

Figure 1:
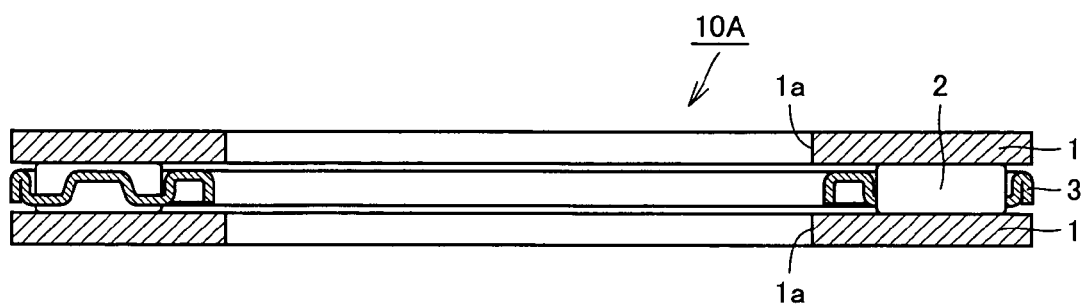
FIG. 1 is a schematic cross sectional view showing a structure of a thrust needle roller bearing in accordance with Embodiment 1 of the present invention.

FIG. 1 is a schematic cross sectional view showing a structure of a thrust needle roller bearing in accordance with Embodiment 1 of the present invention. Referring to FIG. 1, the thrust needle roller bearing 10A has a pair of washers 1, 1, formed of thin steel plates, a plurality of needle rollers rolling between the pair of washers 1, 1, and an annular cage 3 holding the plurality of needle rollers 2 at a prescribed pitch along the circumferential direction. Washer 1 has a through hole 1a at the central portion, for inserting a shaft or the like.

At least washer 1 of thrust needle roller bearing 10A has a nitrogen enriched layer at a surface layer portion, the amount of retained austenite at the surface layer portion is at least 5 volume % and at most 25 volume %, and the austenite grain size number at the surface layer portion is 11 or larger. Preferably, nitrogen concentration at the surface layer portion is at least 0.05 mass % and at most 0.4 mass %.

Alternatively, not only washer 1 but also needle rollers 2 or cage 3 may have a nitrogen enriched layer at the surface layer portion, the amount of retained austenite at the surface layer portion may be at least 5 volume % and at most 25 volume %, and the austenite grain size number at the surface layer portion may be 11 or larger. Nitrogen concentration at the surface layer portion may be at least 0.05 mass % and at most 0.4 mass %.

Figure 2:
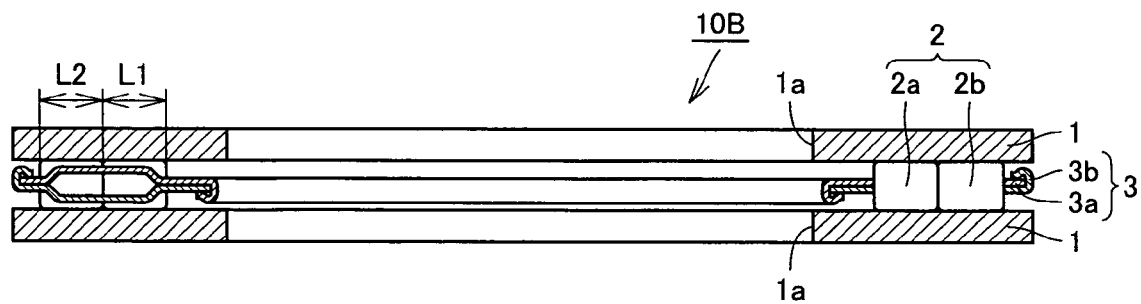
FIG. 2 is a schematic cross sectional view showing a structure of a thrust needle roller bearing having rollers arranged in a plurality of rows, as another form of the thrust needle roller bearing in accordance with Embodiment 1 of the present invention.

Though a structure in which the needle rollers are arranged in a single row has been described above, the needle rollers may be arranged in a plurality of rows, as shown in FIG. 2.

Referring to FIG. 2, the thrust needle roller bearing 10B has needle rollers 2 arranged in a plurality of rows, including needle rollers 2a on the inner diameter side and needle rollers 2b on the outer diameter side. Here, cage 3 is preferably formed by two annular plate members 3a and 3b overlapped to be in contact with each other. Preferably, annular member 3a has an end portion on the inner diameter side bent and crimped to the side of annular member 3b, and annular member 3b has an end portion on the outer diameter side bent and crimped to the side of annular member 3a. In this manner, two annular members 3a and 3b can be fixed by crimping and firmly integrated.

Though lengths L1 and L2 of needle rollers 2a and 2b arranged in a plurality of rows are the same in this example, the length may be selected to L1≦L2 or L2≦L1, dependent on the conditions of use. It is preferred to increase load carrying capacity on the outer diameter side by making the length L2 of the needle roller 2b on the outer diameter side longer, for example, 1.2 times longer, than the length L1 of the needle roller 2a on the inner diameter side.

Except for the point described above, the structure of thrust needle roller bearing 10B is almost the same as that of thrust needle roller bearing 10A described above and, therefore, the same members are denoted by the same reference characters and description thereof will not be repeated.

Next, heat treatment including carbonitriding process performed on at least one bearing component of washer 1, needle roller 2 and cage 3 of each of thrust needle roller bearings 10A and 10B in accordance with the present embodiment will be described.

Figure 3:
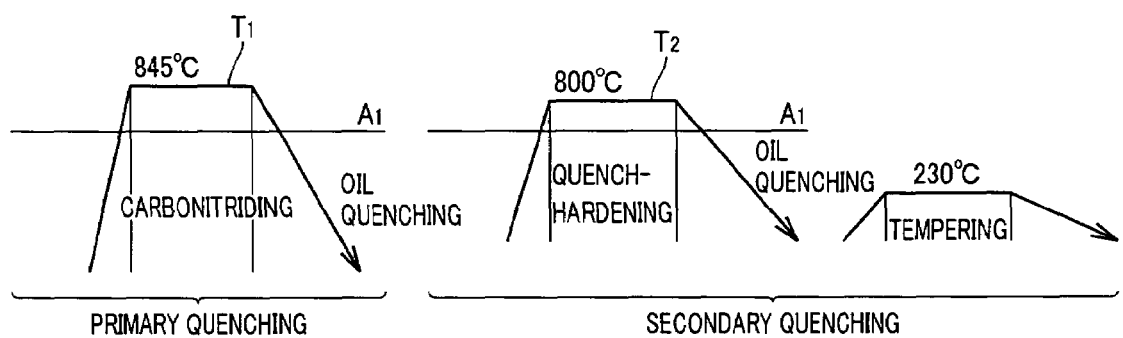
FIG. 3 is an illustration of a method of heat treatment of the thrust needle roller bearing in accordance with the present invention.
Figure 4:
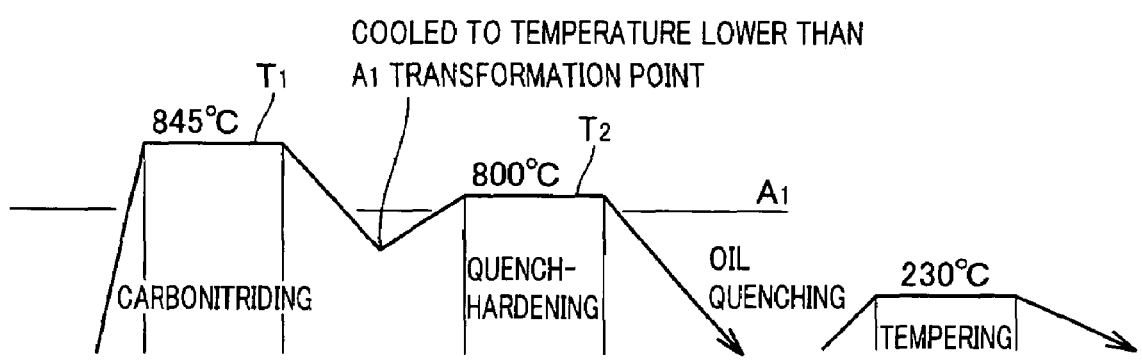
FIG. 4 is an illustration of a modification of the method of heat treatment of the thrust needle roller bearing in accordance with the present invention.

FIGS. 3 and 4 show the method of heat treatment for forming the thrust needle roller bearing in accordance with the present invention. FIG. 3 shows a pattern of heat treatment representing a method involving primary and secondary quenching. FIG. 4 shows a pattern of heat treatment in which the material is cooled to a temperature lower than $A_1$ transformation point during quenching and thereafter re-heated for final quenching. Both are examples of heat treatment for the thrust needle roller bearing of the present invention.

Referring to FIG. 3, first, steel for a bearing component is heated to a carbonitriding temperature $T_1$ (845° C.) not lower than the $A_1$ transformation point, and carbonitriding process is performed on the steel for the bearing component. At the process temperature $T_1$, carbon and nitrogen are diffused to the steel base, and carbon is sufficiently absorbed in steel. Thereafter, the steel for bearing component is subjected to oil quenching from the process temperature $T_1$ to a temperature lower than $A_1$ transformation point. Thereafter, tempering at 230° C. is performed. The tempering may be omitted.

Thereafter, the steel for bearing component is heated again to a temperature $T_2$ (for example, 800° C.), which is not lower than the $A_1$ transformation point and lower than the carbonitriding temperature described above, and kept at the temperature for a process $T_2$, subjected to oil quenching from the process temperature $T_2$ and cooled to a temperature lower than the $A_1$ transformation point. Then, tempering is performed at 230° C.

Referring to FIG. 4, first, steel for a bearing component is heated to a carbonitriding temperature $T_1$ (845° C.) not lower than the $A_1$ transformation point, and carbonitriding process is performed on the steel for the bearing component. At the process temperature $T_1$, carbon and nitrogen are diffused to the steel base, and carbon is sufficiently absorbed in steel. Thereafter, the steel for bearing component is not subjected to quenching but cooled to a temperature lower than the $A_1$ transformation point. Thereafter, the steel for bearing component is heated again to a temperature $T_2$ (for example, 800° C.), which is not lower than the $A_1$ transformation point and lower than the carbonitriding temperature described above, and kept at the temperature for a process $T_2$, subjected to oil quenching from the process temperature $T_2$ and cooled to a temperature lower than the $A_1$ transformation point. Then, tempering is performed at 230° C.

By the carbonitriding process described above, a nitrogen enriched layer, which is the "carbonitrided layer," is formed at the surface layer portion of the steel for bearing component. In the carbonitriding process, steel as the material has high carbon concentration, and therefore, sometimes carbon does not readily enter the surface of steel from common carbonitriding atmosphere. In steel having high carbon concentration (of about 1 mass %), a carburized layer of higher carbon concentration may or may not be generated. On the other hand, though it depends on Cr (chromium) concentration, nitrogen concentration is as low as about 0.020 mass % in typical steel. Therefore, a nitrogen enriched layer is definitely formed regardless of the carbon concentration of material steel. It is needless to say that the nitrogen enriched layer may also be enriched with carbon.

As compared with common quenching (that is, one quenching following carbonitriding process), the heat treatment described above is effective against an early failure caused by surface damage such as surface-originated flaking and also effective against subsurface-originated flaking caused by common rolling contact fatigue dependent on load, while carbonitriding of the surface layer is attained. Therefore, the treatment enables longer life of the thrust needle roller bearing.

Figure 5A:
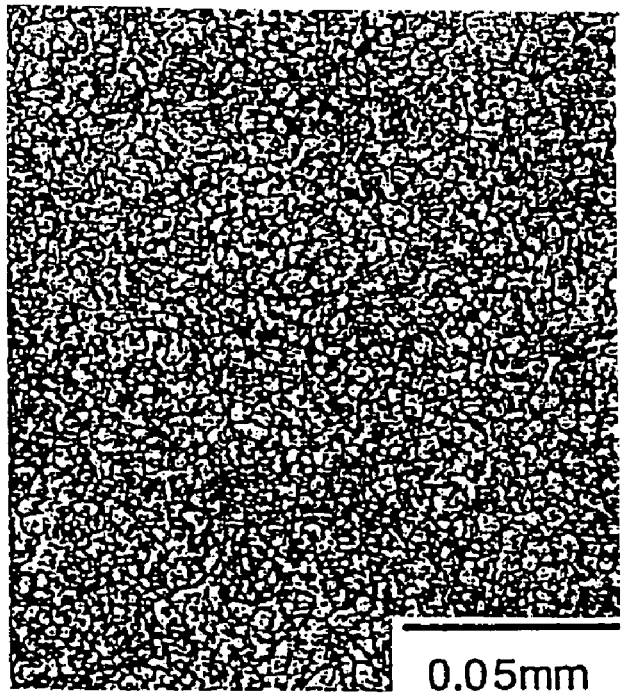
FIG. 5A shows micro-texture, particularly austenite grains of the bearing component in accordance with the present invention.
Figure 5B:
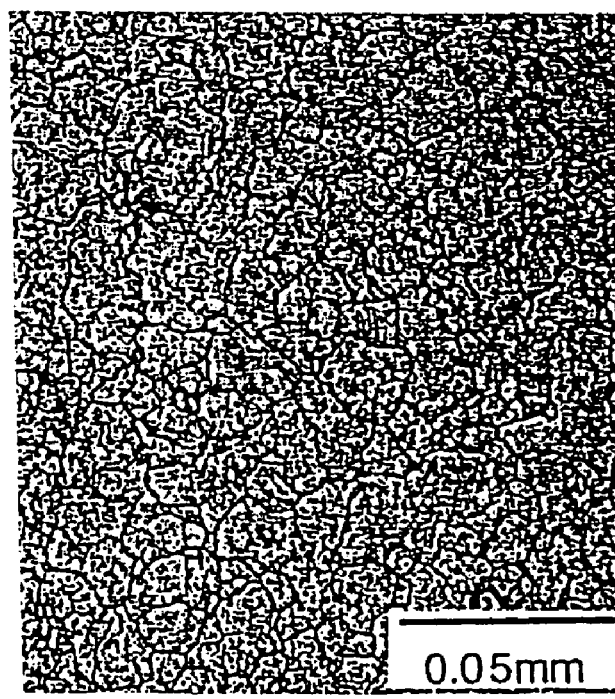
FIG. 5B shows micro-texture, particularly austenite grains of a conventional bearing component.
Figure 6A:
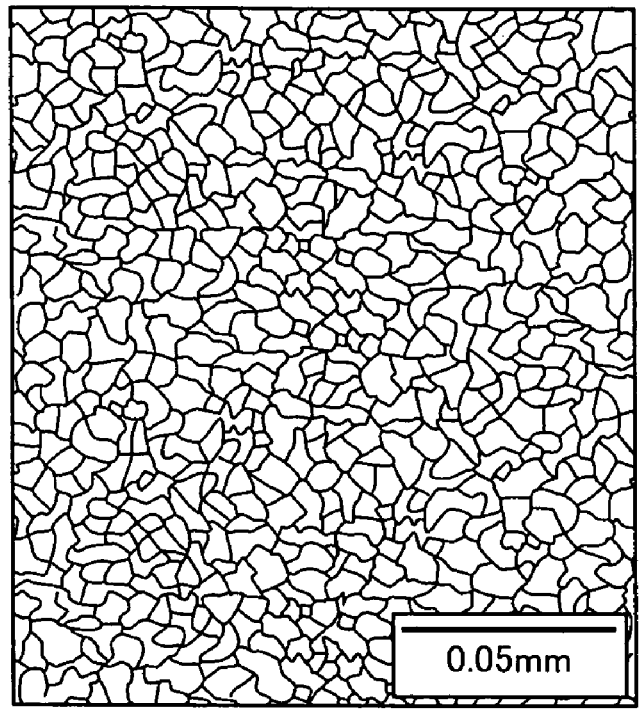
FIG. 6A is an illustration corresponding to FIG. 5A, showing austenite grain boundaries.
Figure 6B:
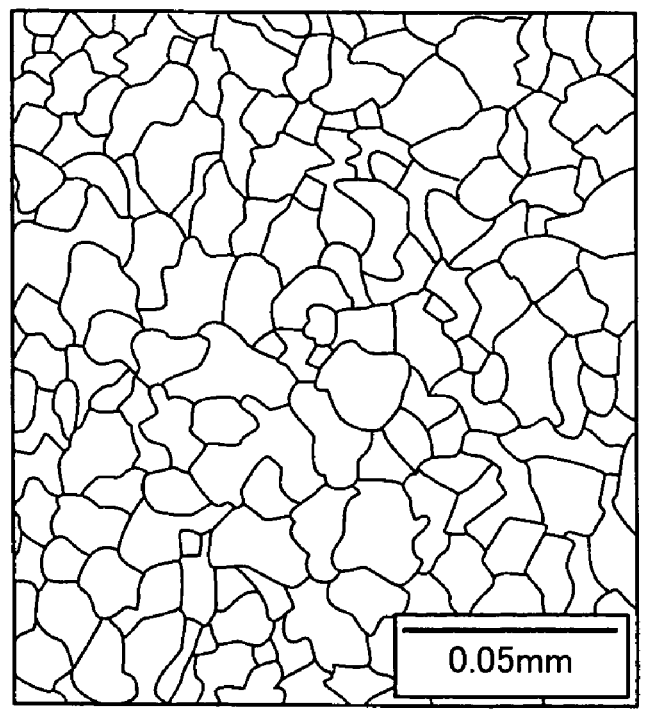
FIG. 6B is an illustration corresponding to FIG. 5B, showing austenite grain boundaries.

FIG. 5A shows austenite grain size of the bearing steel that has been subjected to the heat treatment pattern shown in FIG. 3. For comparison, FIG. 5B shows austenite grain size of the bearing steel that has been subjected to conventional heat treatment. FIGS. 6A and 6B illustrate austenite grain size corresponding to FIGS. 5A and 5B. From these textures showing the austenite grain size, it can be seen that the conventional austenite grain size has JIS (Japanese Industrial Standard) grain size number 10, whereas the heat treatment in accordance with the present invention provides fine grains of number 12. The average grain diameter of FIG. 5A measured by the section method was 5.6 μm.

Next, a compressor for a car air-conditioner using the thrust needle roller bearing 10B (FIG. 2) in accordance with the present embodiment will be described.

Figure 7:
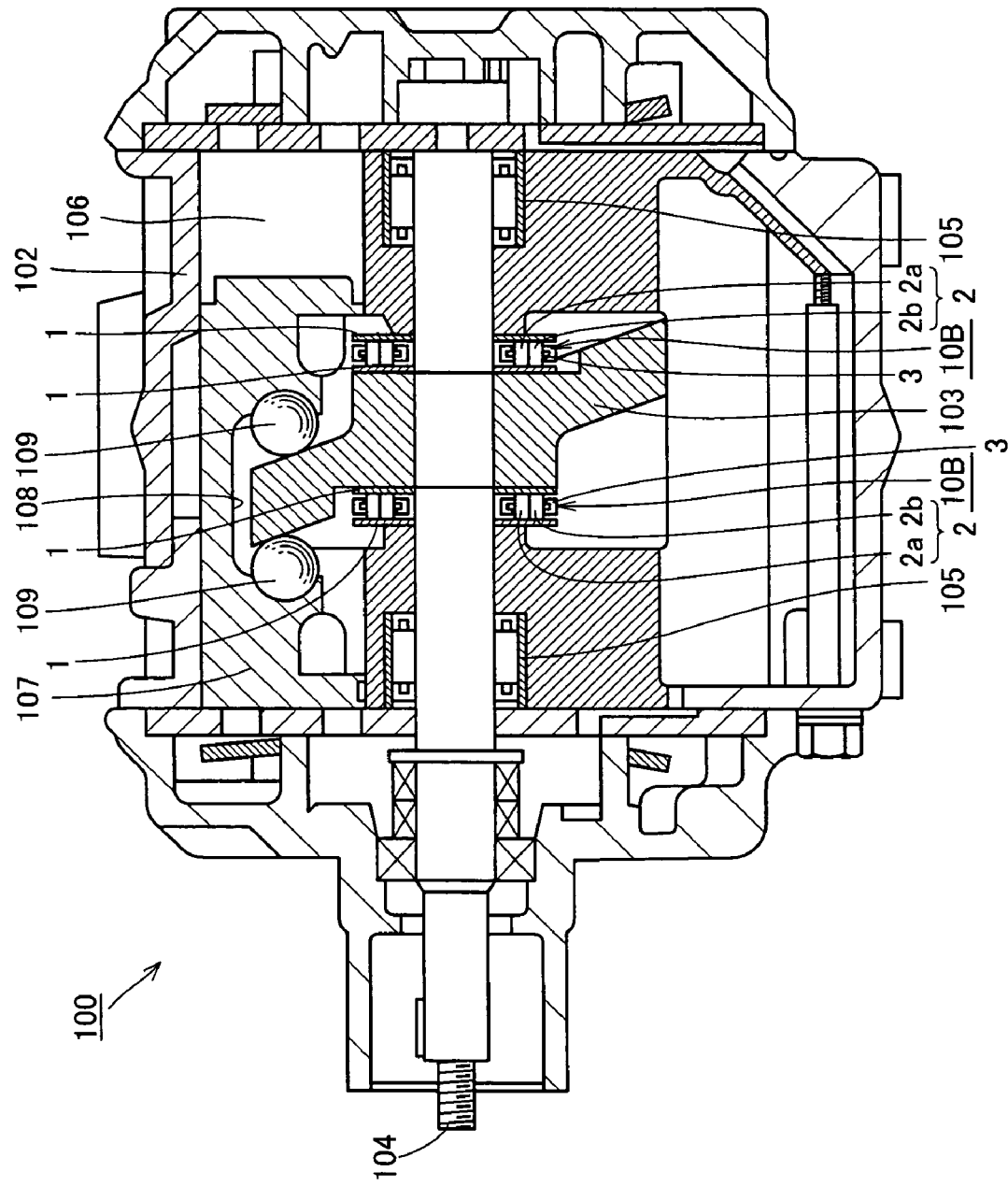
FIG. 7 is a schematic cross sectional view showing a structure of a double-sided swash plate compressor.

FIG. 7 is a schematic cross sectional view showing a structure of a compressor using the thrust needle roller bearing in accordance with Embodiment 1 of the present invention. Referring to FIG. 7, as the compressor, a double-sided swash plate compressor 100 is shown. Swash compressor 100 is structured such that by the rotation of a swash plate 103 fixed on a main shaft 104, a piston 107 reciprocates with a shoe 109 sliding on swash plate 103.

In a housing 102, main shaft 104 having swash plate 103 fixed thereon is rotatably supported by means of a radial bearing 105. In housing 102, a plurality of cylinder bores 106 are formed at equally spaced positions in the circumferential direction, and a double-ended piston 107 is slidably contained in each bore 106. At the central portion of each piston 107, a recessed portion 108 is formed to cross over the circumferential portion of swash plate 103, and on axially opposing surfaces of recessed portion 108, spherical seats are formed, on which a spherical or semi-spherical shoe 109 is seated. Shoe 109 is interposed between swash plate 103 and piston 107, and functions to convert rotational motion of swash plate 103 smooth to reciprocating motion of piston 107.

Swash plate 103 is fixed on main shaft 104 and rotates with main shaft 104. As described above, swash plate 103 functions to cause reciprocating motion of piston 107. Therefore, thrust load generates along the axial direction of main shaft 104. Therefore, thrust needle roller bearing 10B is used as a support structure to receive the thrust load. As described above, thrust needle roller bearing 10B has a pair of washers 1, 1, needle rollers 2a, 2b arranged in a plurality of rows, and a cage 3. One of the pair of washers 1 is mounted on swash plate 103 and the other of the pair of washers 1 is mounted on the side of housing 102.

In the embodiment above, a double-sided swash plate compressor has been described as the compressor. The thrust needle roller bearing of the present invention, however, is also applicable to other types of swash plate compressors or scroll type compressors. The swash plate compressors of the other type may include a one-sided swash plate compressor and a variable capacity, one-sided swash plate compressor.

Figure 8:
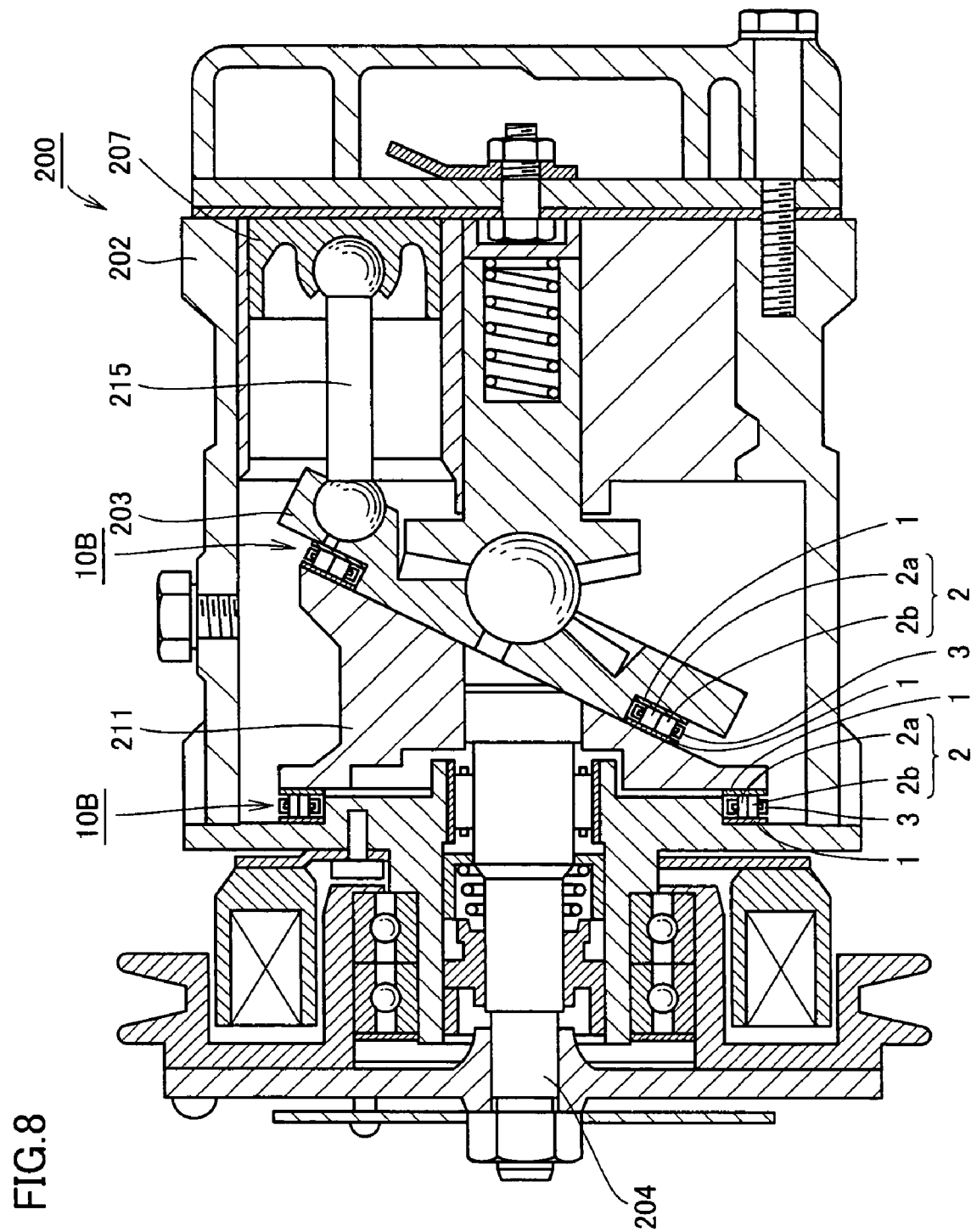
FIG. 8 is a schematic cross sectional view showing a structure of a one-sided swash plate compressor.

In a one-sided swash plate compressor 200, thrust needle roller bearing 10B of a plurality of rows in accordance with the present embodiment is arranged as a support structure to receive the thrust load, between a coupling member 211 and a housing 202 and between coupling member 211 and a swash plate 203, as shown in FIG. 8. Coupling member 211 is a member for coupling swash plate 203 with piston 207. In compressor 200, swash plate 203 rotates with the rotation of main shaft 204, and coupling member 211 swings accordingly, so that through a piston rod 215, piston 207 reciprocates in the cylinder.

Figure 9:
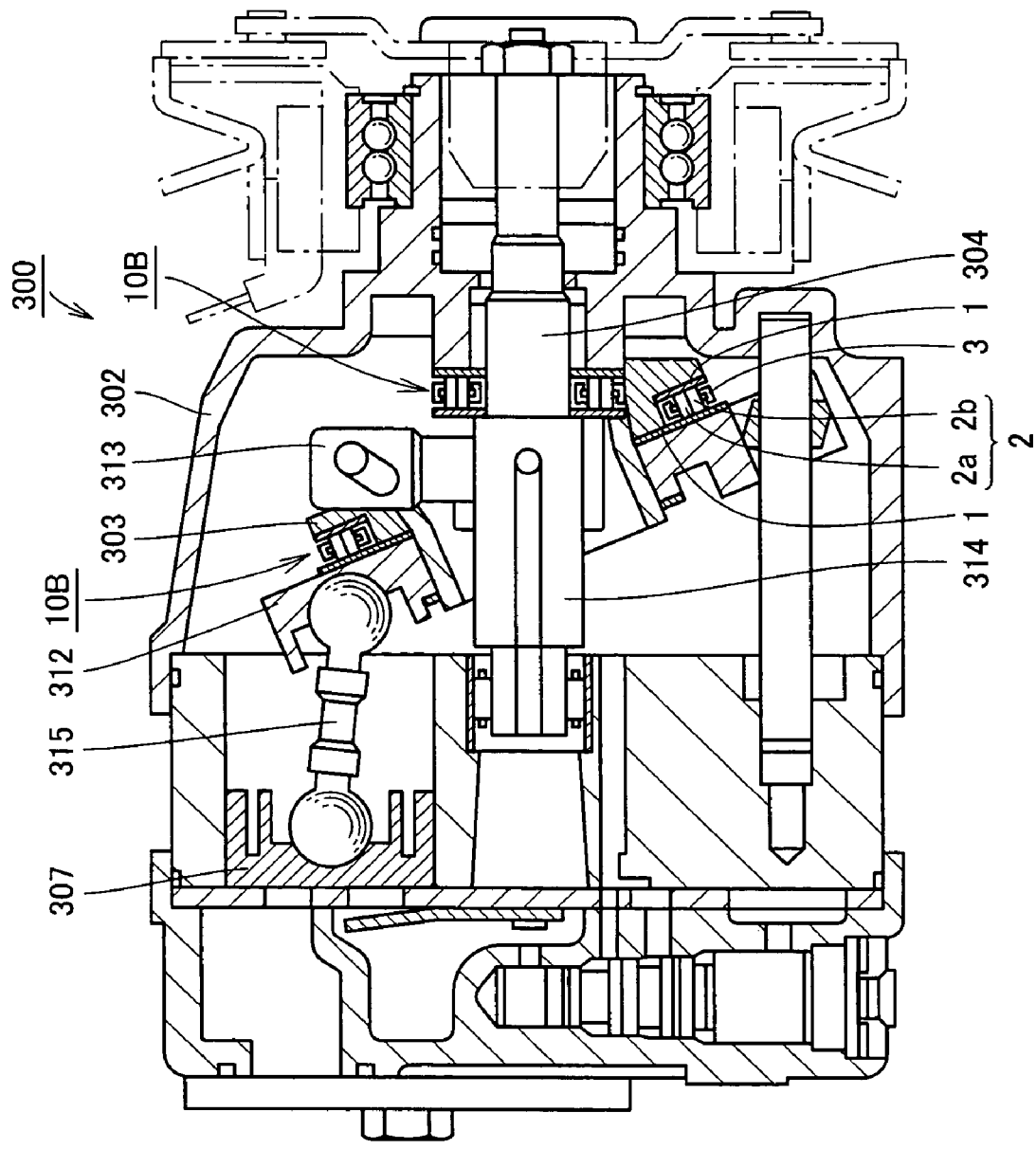
FIG. 9 is a schematic cross sectional view showing a structure of a variable capacity, one-sided swash plate compressor.

In a one-sided swash plate, variable capacity compressor 300, thrust needle roller bearing 10B of a plurality of rows in accordance with the present embodiment is arranged as a support structure to receive the thrust load, between a journal 303 corresponding to the swash plate and a piston support 312, as shown in FIG. 9. Further, thrust needle roller bearing 10B of a plurality of rows in accordance with the present embodiment is arranged as a support structure to receive the thrust load, between a housing 302 and a sleeve 314 of a main shaft 304.

In compressor 300, journal 303 (swash plate) rotates with the rotation of main shaft 304, and piston support swings accordingly, so that through a piston rod 315, piston 307 reciprocates in the cylinder. In compressor 300, the angle of inclination of journal 303 can be changed by sliding sleeve 314 coupled to drive pin 313 in the axial direction with respect to the main shaft 304, whereby the capacity can be changed.

Though examples in which thrust needle roller bearing 10B of a plurality of rows is used in a compressor of a car air-conditioner have been described, thrust needle roller bearing 10A of a single row shown in FIG. 1 may be used in place of thrust needle roller bearing 10B of a plurality of rows.

In the foregoing, a thrust needle roller bearing is used as a support structure receiving thrust load of a compressor for a car air-conditioner has been described. The thrust needle roller bearing of the present invention may be used, in addition to the application above, as a support structure receiving thrust load of a manual transmission.

Embodiment 2

Figure 10:
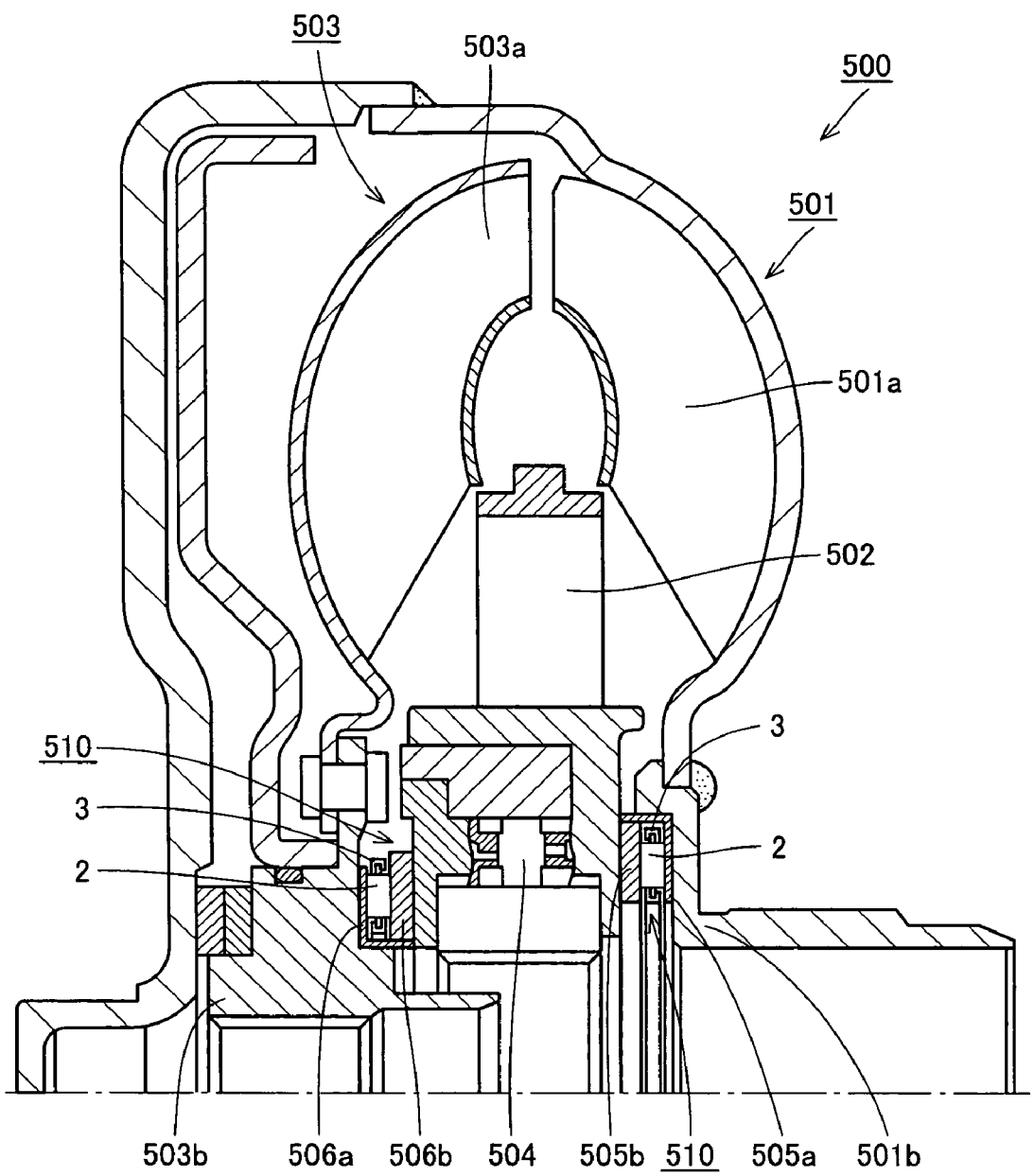
FIG. 10 is a schematic cross sectional view showing a support structure receiving thrust load of an automatic transmission in accordance with Embodiment 2 of the present invention.

FIG. 10 is a schematic cross sectional view showing a support structure receiving thrust load of an automatic transmission in accordance with Embodiment 2 of the present invention. Referring to FIG. 10, an automatic transmission typically consists of a torque converter 500 and a planetary gear mechanism (not shown).

Torque converter 500 mainly has an impeller 501, a stator 502 and a turbine 503. The support structure receiving the thrust load of an automatic transmission in accordance with the present embodiment is a thrust needle roller bearing 510 mounted, for example, between impeller 501 and stator 502, and between stator 502 and turbine 503.

In torque converter 500, impeller 501 coupled to an output shaft of an engine and turbine 503 coupled to an input shaft of the automatic transmission are arranged opposite to each other. Further, stator 502 is attached to a stator shaft fixed on a casing, by means of a one-directional clutch 504. When a liquid under reflux between an impeller blade 501a and a turbine blade 503a each formed to have a bowl shape is returned from the side of turbine 503 to the side of impeller 501 on the inner diameter side, stator 502 changes the direction of liquid flow to exert a forward rotational force to impeller 501, so as to amplify transmission torque.

Thrust needle roller bearing 510 between impeller 501 and stator 502 has needle rollers 2, cage 3 and washers 505a and 505b. Washer 505a is mounted on an impeller hub 501b and washer 505b is mounted on the side of stator 502.

Thrust needle roller bearing 510 between stator 502 and turbine 503 has needle rollers 2, two cages 3 and washers 506a and 506b. Washer 506a is mounted on a turbine hub 503b and washer 506b is mounted on the side of stator 502.

In the present embodiment, each of the thrust needle roller bearings 510 mounted between impeller 510 and stator 502 and between stator 502 and turbine 503 is implemented by the thrust needle roller bearing 10A shown in FIG. 1 or thrust needle roller bearing 10B shown in FIG. 2. Washers 505a and 505b and 506a and 506b each correspond to washer 1 of thrust needle roller bearings 10A and 10B. The structure of thrust needle roller bearing 510 and the method of heat treatment performed on each member are the same as those of Embodiment 1, and therefore, description thereof will not be repeated.

Embodiment 3

In Embodiment 2 above, a support structure receiving thrust load at a portion of torque converter of an automatic transmission has been described. The thrust needle roller bearing in accordance with Embodiment 2 above may be used as a thrust needle roller bearing receiving the thrust load at a gear mechanism portion of the automatic transmission. In the following, an example in which the thrust needle roller bearing of Embodiment 1 is applied to the support structure receiving the thrust load at the gear mechanism portion of the automatic transmission will be described.

Figure 11:
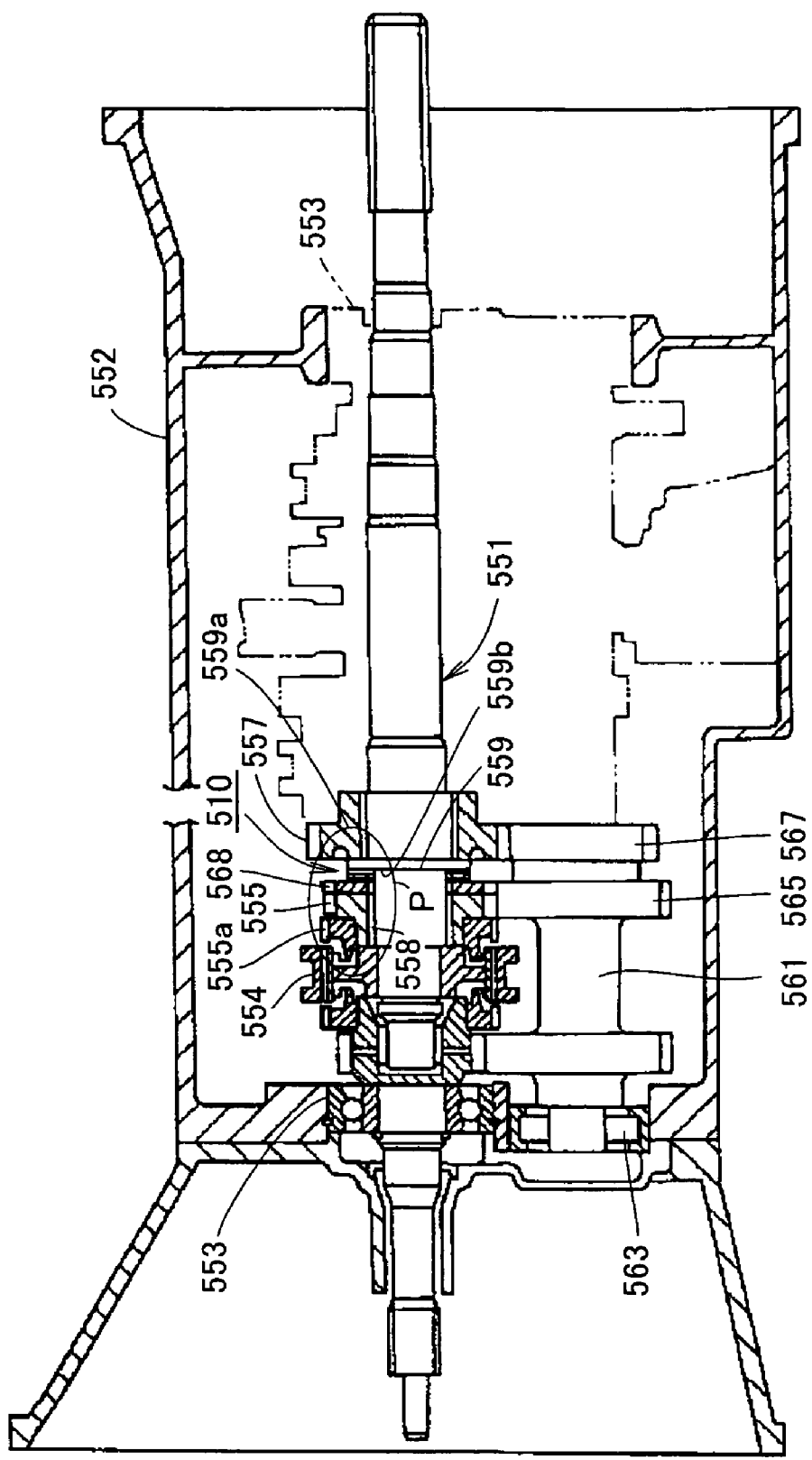
FIG. 11 is a schematic cross sectional view showing a support structure receiving thrust load at a gear mechanism of an automatic transmission in accordance with Embodiment 3 of the present invention.

FIG. 11 is a schematic cross sectional view showing a support structure receiving the thrust load at the gear mechanism of the automatic transmission in accordance with Embodiment 3 of the present invention.

Figure 12:
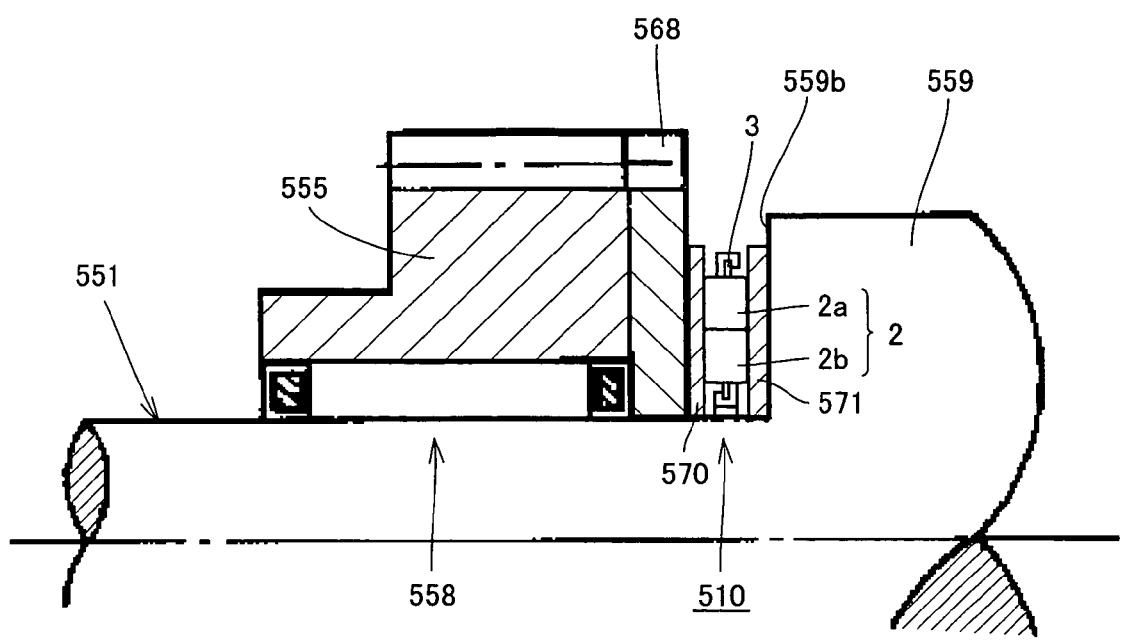
FIG. 12 is a schematic cross sectional view showing, in enlargement, a region P of FIG. 11.

Referring to FIGS. 11 and 12, a shaft 551 is a main shaft, rotatably supported by front and rear bearings 553 in a case 552. On an outer circumference of shaft 551, a sync-hub 554 is provided, and adjacent to one side thereof, an idle gear is provided rotatably, with a roller bearing 558 interposed. Idle gear 555 serves as a three-speed main gear, and has a clutch gear 555a on the side of sync-hub 554. On an outer circumference of shaft 551 on the right side of idle gear 555 as the three-speed main gear, a diameter-expanded portion 559 is formed, and on the right side of diameter-expanded portion 559, another idle gear 557 is rotatably provided on shaft 551 with a roller bearing interposed, to be in contact with a right side step surface 559a. Idle gear 557 serves as a two-speed main gear to be engaged/disengaged with another sync-hub.

A shaft 561 is a counter shaft, and rotatably supported in case 552 by a bearing such as a bearing 563, parallel to shaft 551 described above. On shaft 561, gears 565 and 567 are provided in fixed state, to be engaged with idle gears 555 and 557 described above.

Between a widthwise surface of idle gear 555 as the three-speed main gear and a left side step surface 559b of diameter-expanded portion 559 of shaft 551, a scissors gear (an intervening gear) 568 having the same diameter and slightly different number of teeth as idle gear 555 is provided rotatably on shaft 551, in contact with the widthwise surface of idle gear 555. Idle gear 555 and scissors gear 568 engage with the same gear 565 of shaft 561 as the counter shaft. What is necessary for scissors gear 568 is that it can engage with the same gear 565 as the idle gear 555. In the present embodiment, pitch circle, addendum circle and dedendum circle all have the same diameters as those of idle gear 555. Preferably, the difference in number of teeth between scissors gear 568 and idle gear 555 is at least one. Between scissors gear 568 and the left side step surface 559b of diameter expanded portion 559, thrust needle roller bearing 510 is interposed as the support structure.

Similar to Embodiment 1, thrust needle roller bearing 510 has needle rollers 2, cage 3 and washer 1. A gear side washer 570 in contact with the scissors gear 568 described above of the thrust needle roller bearing 510 is rotatable about shaft 551, and in most cases, a washer 571 in contact with the left side step surface 559b of diameter expanded portion 559 is fixed by a key or the like on shaft 551.

In thrust needle roller bearing 510, needle rollers 2 include needle rollers 2a and 2b arranged in a plurality of rows.

In this structure, in a shift state where sync-hub 554 is engaging with clutch gear 555a of idle gear 555, shaft 551 and idle gear 555 rotate in synchronization, while shaft 551 and scissors gear 568 rotate relative to each other, as the number of teeth of scissors gear 568 is made slightly different from idle gear 555. As a result, relative rotation occurs between gear side washer 570 and washer 571 fixed on the side of the shaft of thrust needle roller bearing 510, and needle rollers 2a and 2b rotate and revolve.

Though examples of automatic transmission have been described in Embodiments 2 and 3, the present invention is widely applicable to a thrust support structure used for overall transmissions, and particularly applicable to a thrust support structure used in oil (lubricant oil) with an additive of a transmission.

Though an example in which the support structure receiving thrust load is mounted between the turbine and the stator and between the stator and the impeller has been described, the present invention is not limited thereto, and it may be applied at other portions of the automatic transmission that receive thrust.

Embodiment 4

Figure 13:
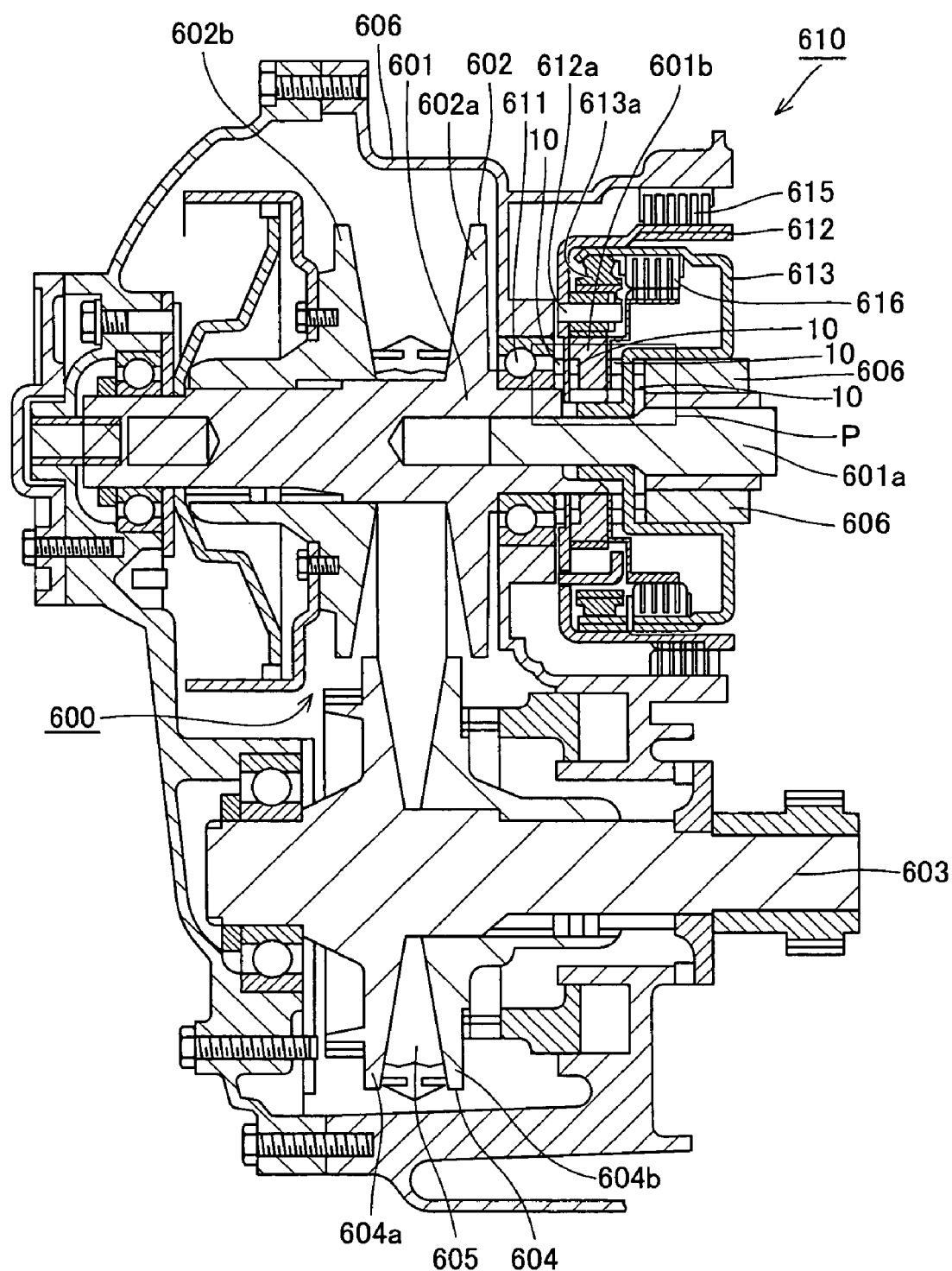
FIG. 13 is a schematic cross sectional view showing a support structure for a continuously variable transmission in accordance with Embodiment 4 of the present invention.

FIG. 13 is a schematic cross sectional view showing a support structure for a continuously variable transmission in accordance with Embodiment 4 of the present invention. Referring to FIG. 13, a driving force generated by an engine (not shown) is transmitted from a crank shaft (not shown) through a torque converter (not shown) and a forward/backward switching mechanism 610 to a continuously variable transmission 600.

Forward/backward switching mechanism 610 has a planetary gear mechanism and multiple disk clutches 615, 616. Planetary gear mechanism has a ring gear 613a fixed on a shaft 601a through a support member 613, a sun gear 601b fixed on a primary shaft 601, and a planetary pinion 612a rotatably supported on a support member 612. Planetary pinion 612a engages with each of ring gear 613a and sun gear 601b.

Multiple disk clutch 615 is mounted as a backward brake between an outer circumference of support member 612 and a housing 606. Multiple disk clutch 616 is mounted as a forward clutch between an outer circumference of primary shaft 601 and an inner circumference of support member 613. A mechanism (not shown) that can apply hydraulic pressure to each of multiple disk clutches 615 and 616 is provided.

When hydraulic pressure is applied and multiple disk clutch (forward clutch) 616 is set to the connected state, rotation of shaft 601a is transmitted in a forward direction to primary shaft 601. When hydraulic pressure is applied and multiple disk clutch (backward brake) 615 is set to the connected state, rotation of shaft 601a is transmitted in a backward direction to primary shaft 601. This enables forward/backward motion control.

Nonstep variable speed gear 600 has an input side primary shaft 601 coupled to forward/backward switching mechanism 610, a primary pulley 602 provided on primary shaft 601, an output side secondary shaft 603 parallel to primary shaft 601, a secondary pulley 604 provided on secondary shaft 603, and a belt wound around both primary and secondary pulleys 602 and 604.

Primary pulley 602 has a fixed pulley 602a fixed on primary shaft 601, and a movable pulley 602b mounted slidable along the axial direction on primary shaft 601 by means of a ball spline or the like. By the sliding of movable pulley 602b in the axial direction, an interval between cone surfaces of the pulley, that is, a pulley groove width, can be varied.

Secondary pulley 604 has a fixed pulley 604a fixed on secondary shaft 603, and a movable pulley 604b mounted slidable along the axial direction on secondary shaft 604b by means of a ball spline or the like. By the sliding of movable pulley 604b in the axial direction, an interval between cone surfaces of the pulley, that is, a pulley groove width, can be varied.

By changing the groove width of both pulleys, contact diameter of belt 605 with pulley 602 and with pulley 604 changes. Consequently, the ratio of winding diameter of belt 605 around pulleys 602 and 604 changes. Thus, the rotation of primary shaft 601 is transmitted to secondary shaft 603 with the speed changed in stepless manner.

In the present embodiment, thrust needle roller bearing 10 is provided to receive thrust load on input side shaft 601a and primary shaft 601 as well as output side secondary shaft 603.

Figure 14:
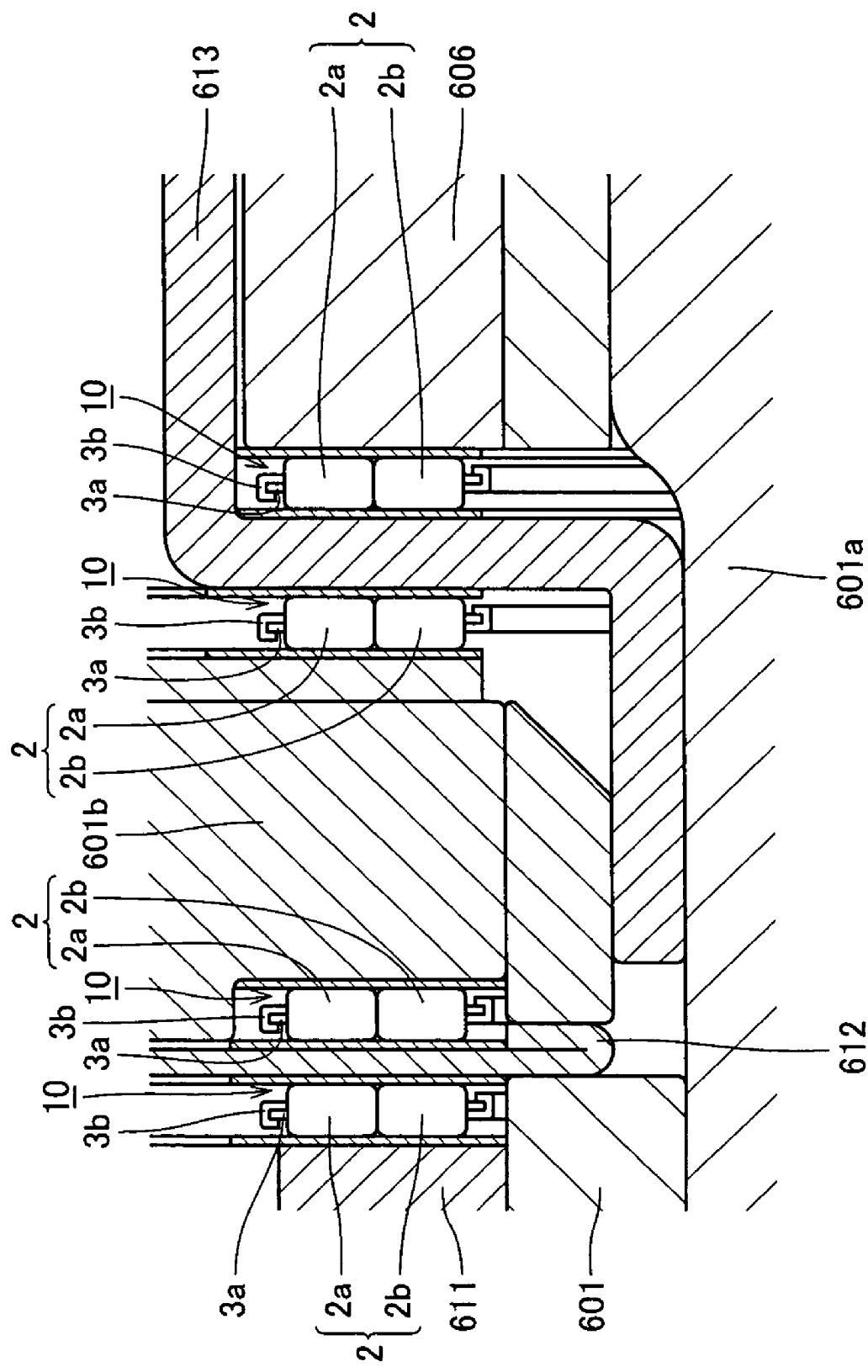
FIG. 14 is a cross sectional view showing, in enlargement, a portion P of FIG. 13.

FIG. 14 is a cross sectional view showing, in enlargement, the portion P of FIG. 13, illustrating how the thrust needle roller bearing is arranged. Referring to FIG. 14, thrust needle roller bearing 10 is arranged, for example, between an inner ring of roller bearing 611 rotatably supporting primary shaft 601 and support member 612, between support member 612 and sun gear 601b, between sun gear 601b and support member 613, and between support member 613 and housing 606. Each thrust needle roller bearing 10 has needle rollers 2 and two cages 3, 4 for holding needle rollers 2. The needle rollers include needle rollers 2a, 2b in a plurality of rows.

Each thrust needle roller bearing 10 of the present embodiment is implemented by thrust needle roller bearing 10B shown in FIG. 2. Alternatively, it may be implemented by thrust needle roller bearing 10A shown in FIG. 1. The structure of thrust needle roller bearing 10 and the method of heat treatment performed on each member are the same as those of Embodiment 1, and therefore, description thereof will not be repeated.

Embodiment 5

Figure 15:
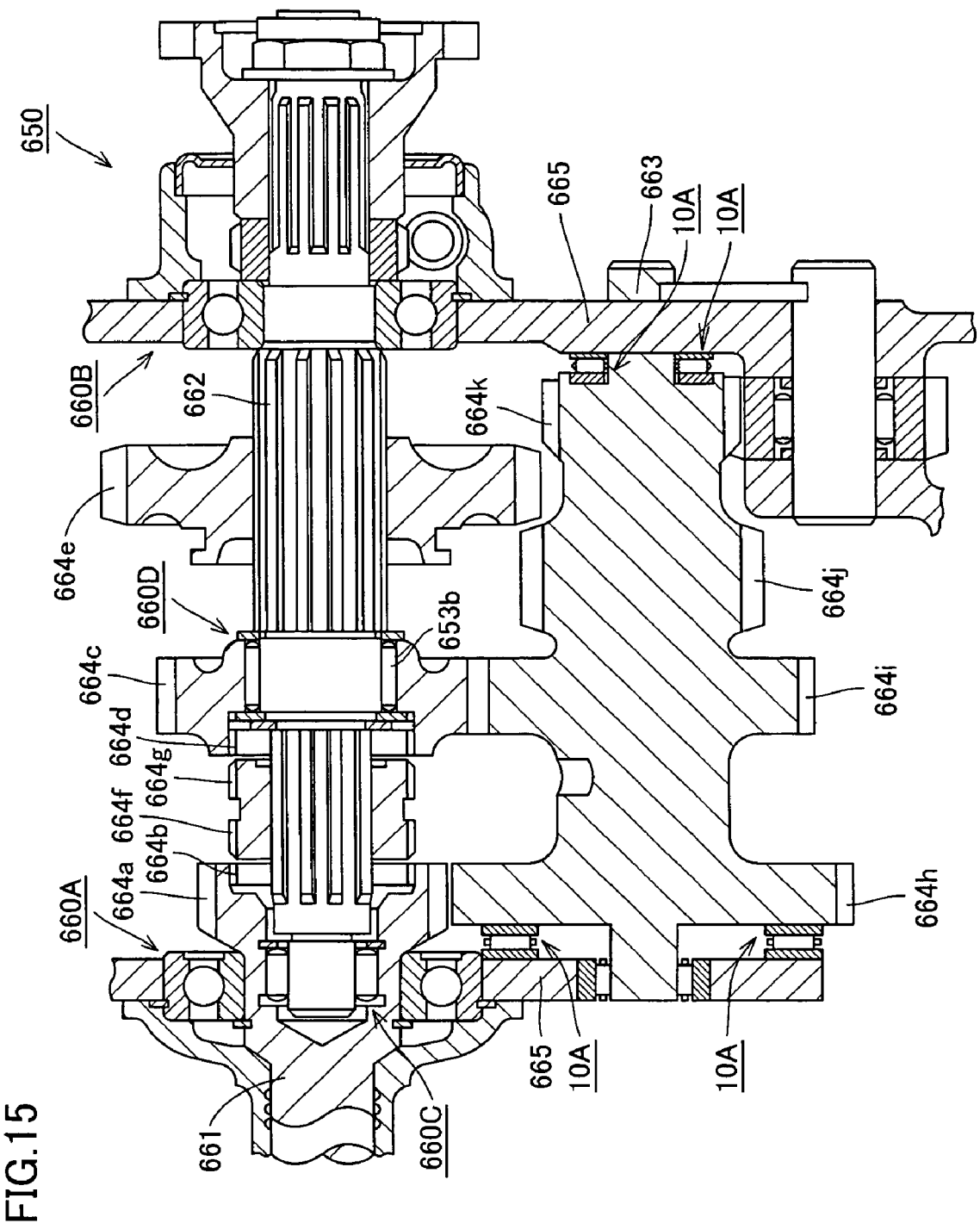
FIG. 15 is a schematic cross sectional view showing a structure of a manual transmission in accordance with Embodiment 5 of the present invention.

FIG. 15 is a schematic cross sectional view showing a structure of a manual transmission in accordance with Embodiment 5 of the present invention. Referring to FIG. 15, a manual transmission 650 is a normally meshing type manual transmission, mainly having four thrust needle roller bearings 10A, an input shaft 661, an output shaft 662, a counter shaft 663, gears 664a to 664k, and a housing 665.

Input shaft 661 is rotatably supported by a roller bearing 660A in housing 665. On an outer circumference of input shaft 661, a gear 664a is formed, and on an inner circumference, a gear 664b is formed.

Output shaft 662 is rotatably supported by a roller bearing 660B in housing 665 on one side (left side in the figure), and rotatably supported by a roller bearing 660C on input shaft 661 on the other side (right side in the figure). On output shaft 662, gears 664c to 664g are mounted.

Gears 664c and 664d are formed on the outer and inner circumference of one same member. The member on which gears 664c and 664d are formed is rotatably supported by a roller bearing 660D on output shaft 662. Gear 664e is attached to output shaft 662 to rotate with output shaft 662 and slidable in the axial direction of output shaft 662.

Each of gears 664f and 664g is formed on an outer circumference of one same member. The member on which gears 664f and 664g are formed is attached to output shaft 662 to rotate with output shaft 662 and slidable in the axial direction of output shaft 662. When the member on which gears 664f and 664g are formed slides to the left side in the figure, gear 664f can mesh with gear 664b, and when it slides to the right side in the figure, gear 664g can mesh with gear 664d.

Counter shaft 663 has gears 664h to 664k and the like. Between counter shaft 663 and housing 665, four thrust needle roller bearing 10A are arranged, by which load (thrust load) in the axial direction of counter shaft 663 is supported. Gears 664h and 664a are normally meshed with each other, and gears 664i and 664c are normally meshed with each other. When gear 664e slides to the left side in the figure, gear 664j can mesh with gear 664e. When gear 664e slides to the right side in the figure, gear 664k can mesh with gear 664e.

The speed changing operation of manual transmission 650 will be described.

In manual transmission 650, by the engagement of gear 664a of input shaft 661 and gear 664h of counter shaft 663, the rotation of input shaft 661 is transmitted to counter shaft 663. By engagement of gears 664i to 664k of counter shaft 663 with gears 664c and 664e of output shaft 662, or with gears 664d and 664g of output shaft 662, rotation of counter shaft 662 is transmitted to output shaft 662. Thus, rotation of input shaft 661 is transmitted to output shaft 662.

When the rotation of input shaft 661 is transmitted to output shaft 662, by changing the gears to be engaged between input shaft 661 and counter shaft 663 and gears engaging between counter shaft 662 and output shaft 663, the speed of rotation of output shaft 662 can be changed stepwise from the speed of rotation of input shaft 661. Alternatively, by direct engagement of gear 664b of input shaft 661 with gear 664f of output shaft 662 without interposing counter shaft 663, the rotation of input shaft 661 can directly be transmitted to output shaft 662.

The speed changing operation of manual transmission 650 will be described more specifically in the following. When gear 664f does not mesh with gear 664b, gear 664g does not mesh with gear 664d and gear 664e meshes with gear 664j, driving force of input shaft 661 is transmitted through gears 664a, 664h and gears 664j and 664e to output shaft 662. This realizes, for example, the first speed.

When gear 664g meshes with gear 664d, and gear 664e does not mesh with gear 664j, driving force of input shaft 661 is transmitted through gears 664a, 664h, 664i, 664c, 664d and 664g to output shaft 662. This realizes, for example, the second speed.

When gear 664f meshes with gear 664b and gear 664e does not mesh with gear 664j, input shaft 661 is directly coupled to output shaft 662 by the engagement between gear 664b and 664f, and driving force of input shaft 661 is directly transmitted to output shaft 662. This realizes, for example, the third speed (top).

In the present embodiment, the support structure receiving thrust load of manual transmission 650 has four thrust needle roller bearings 10A that receive thrust load of counter shaft 663. Each of the thrust needle roller bearings 10A is implemented by thrust needle roller bearing 10A shown in FIG. 1. It may be implemented by thrust needle roller bearing 10B shown in FIG. 2. The structure of thrust needle roller bearings 10A, 10B and the method of heat treatment performed on each member are the same as those of Embodiment 1, and therefore, description thereof will not be repeated.

In the present embodiment, a support structure receiving thrust load of a manual transmission having thrust needle roller bearings 10A for receiving thrust load of counter shaft 663 has been described. Other than such an arrangement, the support structure receiving thrust load of a manual transmission in accordance with the present invention may have thrust needle roller bearings 10A for receiving thrust load of the input shaft or the output shaft.

EXAMPLES

Examples of the present invention will be described in the following.

Rollers and washers (having the thickness of at most 3 mm) formed of press-processable steel plates and steel tapes of SUJ2 material (JIS: high carbon chromium bearing steel material), SCM415M (JIS: chromium-molybdenum steel) and S70C (JIS: carbon steel material for machine structural purpose) were prepared. Various heat treatments were performed on the washers and rollers. The heat treatments included heat treatments of heating patterns shown in FIGS. 3 and 4 (special heat treatment), carbonitriding process, quenching (quench-hardening, high temperature quench-hardening, double quench-hardening) and carburizing process.

In the special heat treatment, the objects were kept in a mixed gas atmosphere of an RX gas and an ammonia gas, at 840° C. for a prescribed time period for carbonitriding, subjected to primary quenching from that temperature, and tempered at 230° C. Thereafter, the temperature was again increased to 800° C., which is lower than the carbonitriding temperature, the components were kept at that temperature for a prescribed time period, subjected to secondary quenching, and then tempered at 230° C.

In the carbonitriding process, the objects were kept at 840° C. for a prescribed time period for carbonitriding, thereafter quenched from that temperature and tempered at 230° C.

In the carbonitriding process+quench-hardening process, the objects were kept at 840° C. for a prescribed time period for carbonitriding, thereafter quenched from that temperature and tempered at 230° C. Then, the temperature was again increased to 840° C., the components were kept at that temperature for a prescribed time period, subjected to quenching, and tempered at 230° C.

In the carburizing process, the objects were kept at 850° C. for a prescribed time period for carburization, subjected to quenching from that temperature, and then tempered at 230° C.

In the quench-hardening process, the objects were kept at 850° C. for a prescribed time period, subjected to quenching from that temperature, and then tempered at 230° C.

In the high temperature quench-hardening process, the objects were kept at 880° C. for a prescribed time period, subjected to quenching from that temperature, and then tempered at 230° C.

In the double quench-hardening process, the objects were kept at 840° C. for a prescribed time period, subjected to primary quenching from that temperature, and then tempered at 230° C. Then, the temperature was again increased to 840° C., the objects were kept at that temperature for a prescribed time period, subjected to secondary quenching from that temperature, and tempered at 230° C.

Crystal grain size numbers, amount of retained austenite and nitrogen content at the surface layer of the washers subjected to the processes above are as shown in Table 1.

Crystal grain size was measured by the method of austenite grain size determination in accordance with JIS G 0551. Average values among ten test samples formed under the same conditions were found.

The amount of retained austenite was measured by X-ray diffraction method, at a depth of 0.05 mm from the surface at four positions of the washer surface. Further, average values among ten test samples (10 samples×4 positions) formed under the same conditions were found.

The nitrogen content at the surface layer portion of washers was measured by EPMA analysis, by cutting the washers vertical to the washer surface. Average values of five samples formed under the same conditions were found.

TABLE 1

Test Sample Materials

|  | Materials and heat treatments of washers | Grain size (No.) | Amount of retained austenite (vol %) | Nitrogen content of surface layer (mass %) |
|---|---|---|---|---|
| Present invention | SUJ2 special heat treatment | 12.5 | 8.2 | 0.25 |
|  | SCM415M special heat treatment | 12.0 | 22.0 | 0.29 |
|  | S70C special heat treatment | 11.5 | 15.4 | 0.27 |
| Comparative Example | SUJ2 carbonitriding | 10.5 | 28 | 0.28 |
|  | SCM415M carbonitriding | 10.0 | 32.4 | 0.33 |
|  | SCM415M carbonitriding + quench-hardening | 11.0 | 27.6 | 0.31 |
|  | S70C carbonitriding | 9.5 | 26.6 | 0.3 |
|  | SUJ2 quench-hardening | 10.0 | 4.2 | 0 |
|  | SCM415M carburizing | 9.5 | 28.2 | 0 |
|  | S70C quench-hardening | 9.5 | 3.8 | 0 |
|  | SUJ2 high temp. quench-hardening | 9.0 | 10.8 | 0 |
|  | SUJ2 double quench-hardening | 11.5 | 4.0 | 0 |

As can be seen from the results shown in Table 1, in all test samples of washers subjected to special heat treatment formed of SUJ2, SCM415M and S70C, a nitrogen enriched layer was observed at the surface layer portion, the grain size number of austenite at the surface layer portion was 11 or higher, amount of retained austenite was at least 5 volume % and at most 25 volume %, and nitrogen content at the surface layer portion was at least 0.1 mass % and at most 0.7 mass %.

The test samples subjected to heat treatments other than the special heat treatment cannot attain one of or both of austenite grain size number of 11 or higher and amount of retained austenite of at least 5 volume % and at most 25 volume %.

Then, thrust needle roller bearings were formed by combining each of the washers described above with rollers, and life test of the thrust needle roller bearings was conducted. The conditions of life test are as shown in Table 2, and the test results are as shown in Table 3.

TABLE 2

| Test Conditions | |
|---|---|
| Load | 4000 N |
| Speed of Rotation | 8000 r/min |
| Lubrication | Mission oil circulating lubrication, natural warming |

TABLE 3

| Example | No. | Characteristics | Life ratio (L10) |
|---|---|---|---|
| Present invention | 1 | washer, roller: SUJ2 special heat treatment | 17.2 |
|  | 2 | washer: SUJ2 special heat treatment roller: SUJ2 carbonitriding | 16.5 |
|  | 3 | washer: SCM415M special heat treatment roller: SUJ2 special heat treatment | 10.8 |
|  | 4 | washer: SCM415M special heat treatment roller: SUJ2 carbonitriding | 8.5 |
|  | 5 | washer: S70C special heat treatment roller: SUJ2 special heat treatment | 14.2 |
|  | 6 | washer: S70C special heat treatment roller: SUJ2 carbonitriding | 13.1 |
| Comparative Example | 7 | washer: SCM415M carbonitriding roller: SUJ2 carbonitriding | 3.0 |
|  | 8 | washer: SCM415M carbonitriding + quench-hardening roller: SUJ2 carbonitriding | 3.3 |
|  | 9 | washer: SCM415M carbonitriding roller: SUJ2 quench-hardening | 1.5 |
|  | 10 | washer, roller: SUJ2 carbonitriding | 4.2 |
|  | 11 | washer: S70C carbonitriding roller: SUJ2 carbonitriding | 3.4 |
|  | 12 | washer: SCM415M carburizing roller: SUJ2 carbonitriding | 1.0 |
|  | 13 | washer: SCM415M carburizing roller: SUJ2 quench-hardening | 0.5 |
|  | 14 | washer: SUJ2 quench-hardening roller: SUJ2 carbonitriding | 0.9 |
|  | 15 | washer: SUJ2 high temperature quench-hardening roller: SUJ2 carbonitriding | 1.0 |
|  | 16 | washer: SUJ2 double quench-hardening roller: SUJ2 carbonitriding | 0.9 |
|  | 17 | washer: SUJ2 quench-hardening roller: SUJ2 quench-hardening | 0.4 |
|  | 18 | washer: S70C quench-hardening roller: SUJ2 quench-hardening | 0.4 |

* Special heat treatment: developed heat treatment

As can be seen from the result of Table 3, the thrust needle roller bearings having washers subjected to the special heat treatment have improved L10 life (number of loaded operation at which 90% of sample thrust needle roller bearings could be used without breakage), and have longer life, as compared with thrust needle roller bearings having washers not subjected to the special heat treatment. Where washers and rollers are of the same material, it can be seen that L10 life can further be improved when not only washers but rollers are subjected to the special heat treatment.

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

INDUSTRIAL APPLICABILITY

The present invention is specifically directed to a thrust needle roller bearing for a compressor of a car air-conditioner and a transmission (manual transmission, automatic transmission and continuously variable transmission). Further, the present invention is directed to a long life support structure for a continuously variable transmission, having a thrust needle roller bearing resistant to an early failure caused by surface damage such as surface-originated flaking and also resistant to common, load dependent rolling contact fatigue.

The invention claimed is:

1. A thrust needle roller bearing having a washer formed of a thin steel plate and a needle roller, wherein at least said washer has a nitrogen enriched layer at a surface layer portion, an average amount of retained austenite in said surface layer portion is at least 8.2 volume % and at most 22.0 volume %, and austenite grain size number defined by Japanese Industrial Standard of said surface layer portion is 11 or higher.

2. The thrust needle roller bearing according to claim 1, wherein nitrogen content of said surface layer portion is in the range of 0.1 mass % to 0.7 mass %.

3. A support structure receiving thrust load of a compressor for a car air-conditioner in which a swash plate rotates as a main shaft rotates and a piston swings accordingly, including
a thrust needle roller bearing receiving thrust load generated by the rotation of said swash plate, having a washer formed of a thin steel plate and a needle roller, wherein at least said washer has a nitrogen enriched layer at a surface layer portion, an average amount of retained austenite in said surface layer portion is at least 8.2 volume % and at most 22.0 volume %, and austenite grain size number defined by Japanese Industrial Standard of said surface layer portion is 11 or higher.

4. The support structure receiving thrust load of a compressor for a car air-conditioner according to claim 3, wherein nitrogen content of said surface layer portion is in the range of 0.1 mass % to 0.7 mass %.

5. A support structure receiving thrust load of an automatic transmission including a torque converter having an impeller and a turbine opposite to each other with a stator in between, comprising
a thrust needle roller bearing having a washer formed of a thin steel plate and a needle roller, at least between said stator and said impeller or between said stator and said turbine, wherein
at least said washer has a nitrogen enriched layer at a surface layer portion, an average amount of retained austenite in said surface layer portion is at least 8.2 volume % and at most 22.0 volume %, and austenite grain size number defined by Japanese Industrial Standard of said surface layer portion is 11 or higher.

6. The support structure receiving thrust load of an automatic transmission according to claim 5, wherein nitrogen content of said surface layer portion is in the range of 0.1 mass % to 0.7 mass %.

7. A support structure for a continuously variable transmission in which rotation of an input shaft is changed in a nonstep manner and transmitted to an output shaft, including
a thrust needle roller bearing receiving thrust load generated by the rotation either of said input shaft or said output shaft, having a washer formed of a thin steel plate and a needle roller, wherein at least said washer has a nitrogen enriched layer at a surface layer portion, an average amount of retained austenite in said surface layer portion is at least 8.2 volume % and at most 22.0 volume %, and austenite grain size number defined by Japanese Industrial Standard of said surface layer portion is 11 or higher.

8. The support structure for a continuously variable transmission according to claim 7, wherein nitrogen content of said surface layer portion is in the range of 0.1 mass % to 0.7 mass %.

9. A support structure receiving thrust load of a manual transmission allowing, by engagement between a gear of an input shaft and a gear of a counter shaft and engagement between a gear of the counter shaft and a gear of an output shaft, stepwise change of speed of rotation of said output shaft from the speed of rotation of said input shaft, including
a thrust needle roller bearing receiving thrust load of any of said input shaft, said counter shaft and said output shaft, having a washer formed of a thin steel plate and a needle roller, wherein at least said washer has a nitrogen enriched layer at a surface layer portion, an average amount of retained austenite in said surface layer portion is at least 8.2 volume % and at most 22.0 volume %, and austenite grain size number defined by Japanese Industrial Standard of said surface layer portion is 11 or higher.

10. The support structure receiving thrust load of a manual transmission according to claim 9, wherein nitrogen content of said surface layer portion is in the range of 0.1 mass % to 0.7 mass %.

* * * * *